US012812450B2

(12) United States Patent
Hedman et al.

(10) Patent No.: US 12,812,450 B2
(45) Date of Patent: Nov. 24, 2026

(54) HANDLING OF HETEROGENEOUS SUPPORT FOR USER EQUIPMENT SLICE MAXIMUM BIT RATE (S-MBR)

(71) Applicant: Telefonaktiebolaget LM Ericsson (publ), Stockholm (SE)

(72) Inventors: Peter Hedman, Helsingborg (SE); Paul Schliwa-Bertling, Ljungsbro (SE); Maria Belen Pancorbo Marcos, Madrid (ES); Angelo Centonza, Granada (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 349 days.

(21) Appl. No.: 18/286,269

(22) PCT Filed: Apr. 8, 2022

(86) PCT No.: PCT/IB2022/053324

§ 371 (c)(1),
(2) Date: Oct. 10, 2023

(87) PCT Pub. No.: WO2022/219478

PCT Pub. Date: Oct. 20, 2022

(65) Prior Publication Data

US 2024/0196263 A1 Jun. 13, 2024

Related U.S. Application Data

(60) Provisional application No. 63/257,831, filed on Oct. 20, 2021, provisional application No. 63/173,694, filed on Apr. 12, 2021.

(51) Int. Cl.
*H04W 28/02* (2009.01)

(52) U.S. Cl.
CPC ................................ *H04W 28/0268* (2013.01)

(58) Field of Classification Search
None
See application file for complete search history.

(56) References Cited

U.S. PATENT DOCUMENTS

2019/0166647 A1 5/2019 Velev et al.
2021/0105652 A1 * 4/2021 Jeong .................. H04M 15/854

FOREIGN PATENT DOCUMENTS

WO 2021063981 A1 4/2021
WO 2021219767 A1 11/2021

OTHER PUBLICATIONS

Author Unknown, "Generic Network Slice Template," Official Document NG. 116, Version 1.0, May 23, 2019, GSMA, 60 pages.

(Continued)

*Primary Examiner* — Andre Tacdiran
(74) *Attorney, Agent, or Firm* — Sonoda & Kobayashi Intellectual Property Law; Sarvajit S. Patil

(57) ABSTRACT

Systems and methods for handling of heterogeneous support for Slice Maximum Bit Rate (S-MBR) enforcement are disclosed. In one embodiment, a method performed in a core network of a cellular communications system comprises, at an Access and Mobility Management Function (AMF), obtaining information about whether a Radio Access Network (RAN) node supports S-MBR enforcement and sending, to a Session Management Function (SMF), a message that comprises an indication of whether the RAN node supports S-MBR enforcement. The method further comprises, at the SMF, sending, to a Policy and Control Function (PCF), a message that comprises an indication of whether the RAN node supports S-MBR enforcement. The method further comprises, at the PCF, making a determination of whether to apply a mechanism to enforce S-MBR for Protocol Data Unit (PDU) session of a wireless communi- (Continued)

cation device on a network slice based on the received indication, and operating accordingly.

10 Claims, 10 Drawing Sheets

(56) References Cited

OTHER PUBLICATIONS

Author Unknown, "Technical Specification Group Services and System Aspects; Study on enhancement of network slicing; Phase 2 (Release 17)," Technical Report 23.700-40, Version 17.0.0, Mar. 2021, 3GPP Organizational Partners, 224 pages.
Author Unknown, "Technical Specification Group Services and System Aspects; System architecture for the 5G System (5GS); Stage 2 (Release 17)," Technical Specification 23.501, Version 17.0.0, Mar. 2021, 3GPP Organizational Partners, 489 pages.
Author Unknown, "Technical Specification Group Services and System Aspects; Procedures for the 5G System (5GS); Stage 2 (Release 17)," Technical Specification 23.502, Version 17.0.0, Mar. 2021, 3GPP Organizational Partners, 646 pages.
Author Unknown, "Technical Specification Group Services and System Aspects; Policy and charging control framework for the 5G System (5GS); Stage 2 (Release 17)," Technical Specification 23.503, Version 17.0.0, Mar. 2021, 3GPP Organizational Partners, 128 pages.
Author Unknown, "Technical Specification Group Core Network and Terminals; 5G System; Principles and Guidelines for Services Definition; Stage 3 (Release 16)," Technical Specification 29.501, Version 16.0.0, Jun. 2019, 3GPP Organizational Partners, 69 pages.
Author Unknown, "Technical Specification Group Services and System Aspects; Telecommunication management; Charging management; 5G data connectivity domain charging; stage 2 (Release 17)," Technical Specification 32.255, Version 17.1.1, Apr. 2021, 3GPP Organizational Partners, 122 pages.
Author Unknown, "Technical Specification Group Radio Access Network; NG-RAN; NG Application Protocol (NGAP) (Release 16)," Technical Specification 38.413, Version 16.5.0, Apr. 2021, 3GPP Organizational Partners, 473 bages.
Author Unknown, "Technical Specification Group Radio Access Network; NG-RAN; NG Application Protocol (NGAP) (Release 16)," Technical Specification 38.413, Version 16.7.0, Oct. 2021, 3GPP Organizational Partners, 474 pages.
SA WG2, "SP-190931: New SID: Feasability on Multimedia Priority Service (MPS) Phase 2, Stage 2," 3GPP TSG SA Meeting #85, Sep. 17-20, 2019, Newport Beach, California, 3 pages.
International Search Report and Written Opinion for International Patent Application No. PCT/EP2020/077292, mailed Dec. 14, 2020, 11 pages.
International Search Report and Written Opinion for International Patent Application No. PCT/IB2022/053324, mailed Jun. 15, 2022, 20 pages.
Written Opinion for International Patent Application No. PCT/IB2022/053324, mailed Feb. 22, 2023, 12 pages.
International Preliminary Report on Patentability for International Patent Application No. PCT/IB2022/053324, mailed May 23, 2023, 35 pages.

* cited by examiner

HANDLING OF HETEROGENEOUS SUPPORT FOR USER EQUIPMENT SLICE MAXIMUM BIT RATE (S-MBR)

RELATED APPLICATIONS

This application is a 35 U.S.C. § 371 national phase filing of International Application No. PCT/IB2022/053324, filed Apr. 8, 2022, which claims the benefit of provisional patent application Ser. No. 63/173,694, filed Apr. 12, 2021, and provisional patent application Ser. No. 63/257,831, filed Oct. 20, 2021, the disclosures of which are hereby incorporated herein by reference in their entireties.

TECHNICAL FIELD

The present disclosure relates to a cellular communications system and, more specifically, to handling and enforcement of a maximum bit rate for a network slice.

BACKGROUND

The Third Generation Partnership Project (3GPP) study item on enhancements for network slicing phase 2 is documented in 3GPP Technical Report (TR) 23.700-40 v. 17.0.0. Key Issue #3 defined a new Quality of Service (QOS) parameter called "Maximum UL/DL throughput per UE" and proposed to study how to define this QoS parameter, where this QoS parameter should be enforced, how to signal this QoS parameter to the enforcement point, and any impacts on subscription data.

The conclusions to this Key Issue said:

A new QoS parameter, "Slice-Maximum Bit Rate" (S-MBR) is defined. The uplink (UL)/downlink (DL) Slice-MBR QOS parameter limits the aggregate data rate in UL and DL per User Equipment (UE) across all Guaranteed Bit Rate (GBR) and Non-GBR QoS Flows for all Protocol Data Unit (PDU) sessions associated with a Single Network Slice Selection Assistance Information (S-NSSAI) for the UE. The value of UL/DL Slice-MBR is stored in the Unified Data Repository (UDR).

Different UEs that can use a Network Slice identified with a certain S-NSSAI value can have a different Slice-MBR QOS parameter value depending on the UE subscription.

The Radio Access Network (RAN) enforces the UL/DL Slice-MBR, then refer to solution #22 in 3GPP TR 23.700-40.

The Policy Control Function (PCF) shall be able to receive the S-MBR to be able to enable policy control of existing QoS parameters for the PDU session(s) not to exceed the S-MBR.

The conclusions indicate that the S-MBR, also referred as UE-Slice-MBR, can be enforced both (a) at the RAN and (b) the PCF, where the PCF ensures that the QoS parameters for the PDU sessions of a UE in a network slice do not exceed the S-MBR.

SUMMARY

Systems and methods for handling of heterogeneous support for Slice Maximum Bit Rate (S-MBR) enforcement are disclosed. In one embodiment, a method performed in a core network of a cellular communications system comprises, at an Access and Mobility Management Function (AMF), obtaining information about whether a Radio Access Network (RAN) node supports S-MBR enforcement and sending, to a Session Management Function (SMF), a message that comprises an indication of whether the RAN node supports S-MBR enforcement. The method further comprises, at the SMF, sending, to a Policy and Control Function (PCF), a message that comprises an indication of whether the RAN node supports S-MBR enforcement. The method further comprises, at the PCF, receiving, from the SMF, the message that comprises the indication of whether the RAN node supports S-MBR enforcement, making a determination of whether to apply a mechanism to enforce S-MBR for Protocol Data Unit (PDU) session of a wireless communication device on a network slice based on whether the RAN node supports S-MBR enforcement as indicated by the received message, and operating in accordance with the determination. In this manner, heterogeneous support for S-MBR in the RAN is handled.

Embodiments of a method performed by a core network node in a core network of a cellular communications system are also disclosed. In one embodiment, a method performed by a core network node in a core network of a cellular communications system comprises obtaining information that indicates whether a RAN node supports S-MBR enforcement and making a determination of whether to apply a mechanism to enforce an S-MBR for one or more PDU sessions of a wireless communication device on a network slice in the core network based on whether the RAN node supports S-MBR enforcement as indicated by the obtained information. The method further comprises operating in accordance with the determination.

In one embodiment, the core network node is a PCF, an AMF, or an SMF.

In one embodiment, the obtained information comprises information that indicates that that RAN node supports S-MBR enforcement, making the determination comprises making the determination to not apply the mechanism to enforce S-MBR in the core network, and operating in accordance with the determination comprises operating such that the mechanism to enforce S-MBR in the core network is not applied.

In one embodiment, the obtained information comprises information that indicates that that RAN node does not support S-MBR enforcement, making the determination comprises making the determination to apply the mechanism to enforce S-MBR in the core network, and operating in accordance with the determination comprises operating such that the mechanism to enforce S-MBR in the core network is applied.

In one embodiment, the core network node is a PCF. In one embodiment, obtaining the information comprises receiving a message that comprises information that indicates whether the RAN node supports S-MBR enforcement. In one embodiment, receiving the message comprises receiving the message from an AMF. In one embodiment, the message received at the PCF comprises information that indicates that that RAN node supports S-MBR enforcement, making the determination comprises making the determination to not apply the mechanism to enforce S-MBR at the PCF, and operating in accordance with the determination comprises refraining from applying the mechanism to enforce S-MBR at the PCF. In another embodiment, the message received at the PCF comprises information that indicates that that RAN node does not support S-MBR enforcement, making the determination comprises making the determination to apply the mechanism to enforce S-MBR at the PCF, and operating in accordance with the determination comprises applying the mechanism to enforce S-MBR at the PCF.

Corresponding embodiments of a network node are also disclosed. In one embodiment, a network node for hosting a core network function of a core network of a cellular communications system is adapted to obtain information that indicates whether a RAN node supports S-MBR enforcement, make a determination of whether to apply a mechanism to enforce an S-MBR for one or more PDU sessions of a wireless communication device on a network slice in the core network based on whether the RAN node supports S-MBR enforcement as indicated by the obtained information, and operate in accordance with the determination.

In one embodiment, a network node for hosting a core network function of a core network of a cellular communications system comprises processing circuitry configured to cause the network node to obtain information that indicates whether a RAN node supports S-MBR enforcement, make a determination of whether to apply a mechanism to enforce an S-MBR for one or more PDU sessions of a wireless communication device on a network slice in the core network based on whether the RAN node supports S-MBR enforcement as indicated by the obtained information, and operate in accordance with the determination.

Embodiments of a method performed by an AMF in a core network of a cellular communications system are also disclosed. In one embodiment, a method performed by an AMF in a core network of a cellular communications system comprises obtaining information about whether a RAN node supports S-MBR enforcement and sending, to a SMF, a message that comprises an indication of whether the RAN node supports S-MBR enforcement.

In one embodiment, obtaining the information about whether the RAN node supports S-MBR enforcement comprises receiving the information about whether the RAN node supports S-MBR enforcement from another network node. In one embodiment, the other network node is an Operations and Management (OAM) node.

In one embodiment, obtaining the information about whether the RAN node supports S-MBR enforcement comprises receiving, from the RAN node, a message that indicates failure of a procedure where S-MBR is included. In one embodiment, the message that indicates failure of a procedure where S-MBR is included in an initial context setup failure message.

In one embodiment, obtaining the information about whether the RAN node supports S-MBR enforcement comprises receiving, from the RAN node, an indication that the RAN node supports S-MBR enforcement. In one embodiment, receiving the indication from the RAN node comprises receiving the S-MBR that is associated with a specific network slice that can be enforced or some other kind of 'ack' in an appropriate message. In another embodiment, receiving the indication from the RAN node comprises receiving the indication during a NG-setup procedure.

In one embodiment, the message sent from the AMF to the SMF that comprises the indication of whether the RAN node supports S-MBR enforcement is a Nsmf_PDUSession_CreateSMContext Request message.

Corresponding embodiments of a network node for hosting an AMF are also disclosed. In one embodiment, a network node for hosting an AMF of a core network of a cellular communications is adapted to obtain information about whether a RAN node supports S-MBR enforcement and send, to a SMF, a message that comprises an indication of whether the RAN node supports S-MBR enforcement.

In one embodiment, a network node for hosting an AMF of a core network of a cellular communications comprises processing circuitry configured to cause the network node to obtain information about whether a RAN node supports S-MBR enforcement and send, to a SMF, a message that comprises an indication of whether the RAN node supports S-MBR enforcement.

In another embodiment, a method performed in a cellular communications system comprises, at a core network node in a core network of the cellular communications system, sending a message to a RAN node in a RAN of the cellular communications system, the message comprising S-MBR information for one or more network slices. The method further comprises, at a RAN node in a RAN of the cellular communications system, receiving the message comprising the S-MBR information for one or more network slices from the core network node and sending a response to the core network node, the response comprising information that explicitly or implicitly indicates whether the RAN node supports S-MBR enforcement and/or whether S-MBR enforcement is feasible at the RAN node.

In one embodiment, a method performed by a core network node in a core network of a cellular communications system comprises sending a message to a RAN node in a RAN of the cellular communications system, the message comprising slice-maximum bit rate, S-MBR, information for one or more network slices. The method further comprises receiving a response from the RAN node, the response comprising information that explicitly or implicitly indicates whether the RAN node supports S-MBR enforcement and/or whether S-MBR enforcement is feasible at the RAN node.

In one embodiment, the message is a message associated to signaling or updating of a UE context of an associated UE.

In one embodiment, the message is a message associated to signaling of a PDU session modification.

In one embodiment, the message is an Initial UE Context Setup Request message and the response is an Initial UE Context Setup Failure message. In one embodiment, the S-MBR information comprises one or more S-MBR values for one or more network slices for which PDU sessions with an active user plane are established at the RAN node. In one embodiment, the S-MBR information comprises one or more S-MBR values for one or more network slices that do not have an active user plane connection established at the RAN node.

In one embodiment, the information comprised in the response comprises information that indicates whether the RAN node supports S-MBR enforcement, information that indicates whether S-MBR enforcement is feasible at the RAN node for a particular network slice, or both.

In one embodiment, the information comprised in the response comprises information that indicates whether the RAN node supports S-MBR enforcement, information that indicates whether S-MBR enforcement is feasible at the RAN node for a particular PDU session, or both.

In one embodiment, the information comprised in the response comprises, for each PDU session of one or more PDU sessions for which an active user plane is established at the RAN node, information that indicates whether the RAN node supports S-MBR enforcement, information that indicates whether S-MBR enforcement is feasible at the RAN node for the PDU session, or both.

In one embodiment, the information comprised in the response comprises a slice maximum bit rate enforcement indicator.

In one embodiment, the response is a NGAP message.

In one embodiment, the response is a PDU session response setup response, a PDU session resource modify response, a PDU session resource notify, an initial UE context setup response, or a handover request acknowledge.

In one embodiment, the method further comprises performing one or more actions based on the information comprised in the response.

In one embodiment, the core network node is an AMF.

Corresponding embodiments of a network node are also disclosed. In one embodiment, a network node for hosting a core network function of a core network of a cellular communications system is adapted to send a message to a RAN node in a RAN of the cellular communications system, the message comprising S-MBR information for one or more network slices. The network node is further adapted to receive a response from the RAN node, the response comprising information that explicitly or implicitly indicates whether the RAN node supports S-MBR enforcement and/or whether S-MBR enforcement is feasible at the RAN node.

In one embodiment, a network node for hosting a core network function of a core network of a cellular communications system comprises processing circuitry configured to cause the network node to send a message to a RAN node in a RAN of the cellular communications system, the message comprising S-MBR information for one or more network slices. The network node is further adapted to receive a response from the RAN node, the response comprising information that explicitly or implicitly indicates whether the RAN node supports S-MBR enforcement and/or whether S-MBR enforcement is feasible at the RAN node.

In one embodiment, a method performed by a RAN node in a RAN of a cellular communications system comprises receiving a message from a core network node in a core network of the cellular communications system, the message comprising S-MBR information for one or more network slices. The method further comprises sending a response to the core network node, the response comprising information that explicitly or implicitly indicates whether the RAN node supports S-MBR enforcement and/or whether S-MBR enforcement is feasible at the RAN node.

In one embodiment, the message is a message associated to signaling or updating of a UE context of an associated UE.

In one embodiment, the message is a message associated to signaling of a PDU session modification.

In one embodiment, the message is an Initial UE Context Setup Request message and the response is an Initial UE Context Setup Failure message. In one embodiment, the S-MBR information comprises one or more S-MBR values for one or more network slices for which PDU sessions with an active user plane are established at the RAN node. In one embodiment, the S-MBR information comprises one or more S-MBR values for one or more network slices that do not have an active user plane connection established at the RAN node.

In one embodiment, the information comprised in the response comprises information that indicates whether the RAN node supports S-MBR enforcement, information that indicates whether S-MBR enforcement is feasible at the RAN node for a particular network slice, or both.

In one embodiment, the information comprised in the response comprises information that indicates whether the RAN node supports S-MBR enforcement, information that indicates whether S-MBR enforcement is feasible at the RAN node for a particular PDU session, or both.

In one embodiment, the information comprised in the response comprises, for each PDU session of one or more PDU sessions for which an active user plane is established at the RAN node, information that indicates whether the RAN node supports S-MBR enforcement, information that indicates whether S-MBR enforcement is feasible at the RAN node for the PDU session, or both.

In one embodiment, the information comprised in the response comprises a slice maximum bit rate enforcement indicator.

In one embodiment, the response is a NGAP message.

In one embodiment, the response is a PDU session response setup response, a PDU session resource modify response, a PDU session resource notify, an initial UE context setup response, or a handover request acknowledge.

In one embodiment, the core network node is an AMF.

Corresponding embodiments of a RAN node for a RAN of a cellular communications system are also disclosed. In one embodiment, a RAN node or a RAN of a cellular communications system is adapted to receive a message from a core network node in a core network of the cellular communications system, the message comprising S-MBR information for one or more network slices. The RAN node is further adapted to send a response to the core network node, the response comprising information that explicitly or implicitly indicates whether the RAN node supports S-MBR enforcement and/or whether S-MBR enforcement is feasible at the RAN node.

In one embodiment, a RAN node or a RAN of a cellular communications system comprise processing circuitry configured to cause the RAN node to receive a message from a core network node in a core network of the cellular communications system, the message comprising S-MBR information for one or more network slices. The processing circuitry is further configured to cause the RAN node to send a response to the core network node, the response comprising information that explicitly or implicitly indicates whether the RAN node supports S-MBR enforcement and/or whether S-MBR enforcement is feasible at the RAN node.

BRIEF DESCRIPTION OF THE DRAWINGS

The accompanying drawing FIGURES incorporated in and forming a part of this specification illustrate several aspects of the disclosure, and together with the description serve to explain the principles of the disclosure.

DETAILED DESCRIPTION

Figure 1:
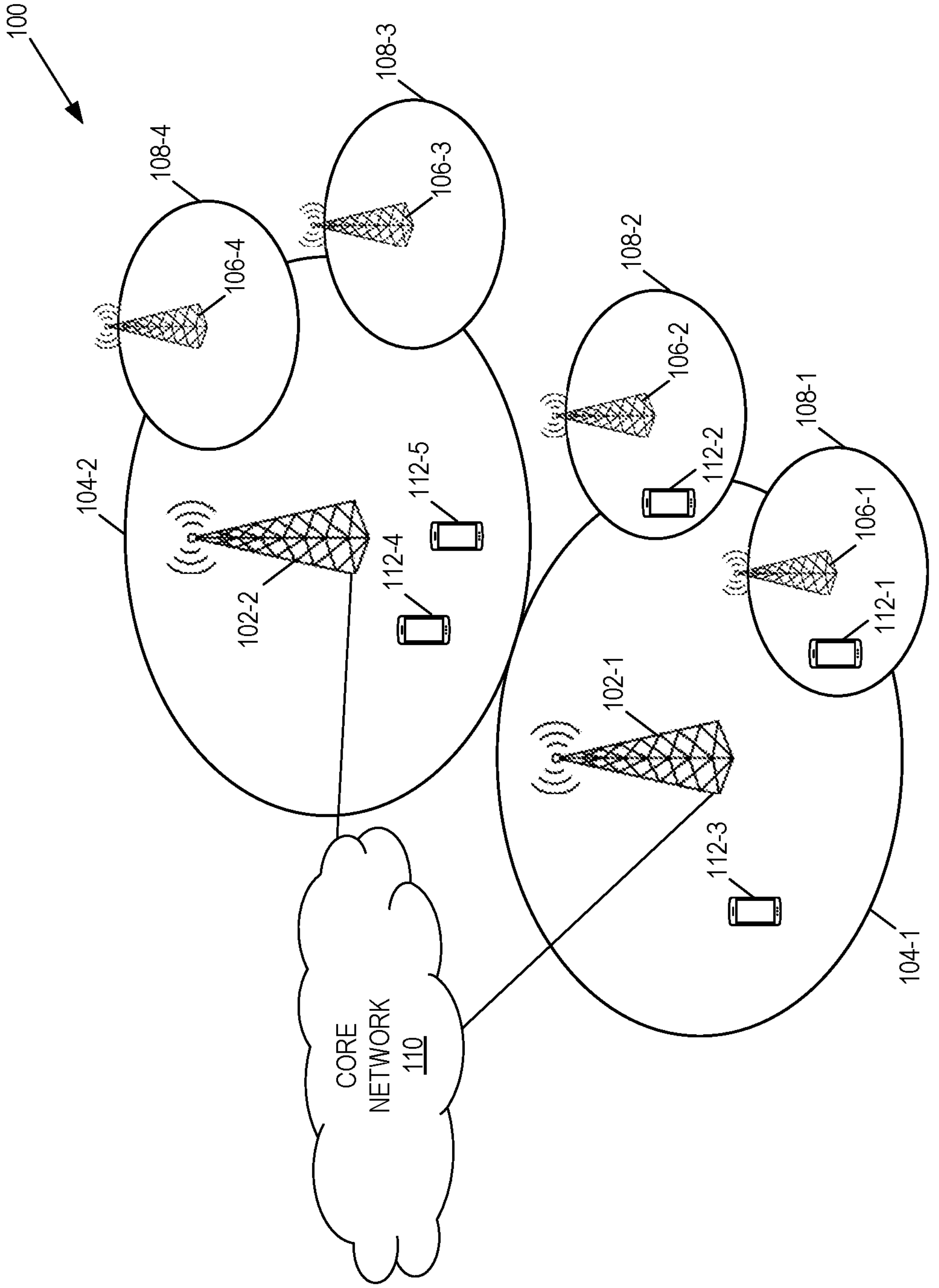
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing FIGURES, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node or RAN Node: As used herein, a "radio access node" or "radio network node" or "radio access network node" or "RAN node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). As discussed above, the conclusions to Key Issue #3 in the 3GPP study item on enhancements for network slicing phase 2 is documented in 3GPP Technical Report (TR) 23.700-40 v. 17.0.0 indicate that the Slice Maximum Bit Rate (S-MBR) can be enforced both (a) at the RAN and (b) the PCF, where the PCF ensures that the Quality of Service (QOS) parameters for the Protocol Data Unit (PDU) sessions of a UE in a network slice do not exceed the S-MBR. Thus, there are two mechanisms to enforce the S-MBR; however, there is no way to control which mechanism should be used for a given UE. Thus, it may happen that either none of the mechanisms are enforced or both are enforced for the same UE.

Certain aspects of the present disclosure and their embodiments may provide solutions to the aforementioned or other challenges. Systems and methods are disclosed herein for determining which mechanism to apply to enforce the S-MBR for a UE. In one embodiment, the mechanism to apply to enforce the S-MBR for a UE is determined as follows:

a) If the RAN (e.g., if a RAN node or base station such as a gNB associated to the UE) supports and is able to perform S-MBR enforcement, then the PCF does not monitor the QoS parameters within the limits of the S-MBR for the UE.
b) If RAN (e.g., if a RAN node or base station such as a gNB associated to the UE) does not support S-MBR enforcement or is not able to perform the enforcement for some reason, then the PCF monitors the QoS parameters of any PDU session of the UE within a S-NSSAI do not exceed the S-MBR.

The following alternatives can be used to determine if the RAN (e.g., a RAN node or base station such as a gNB associated to the UE) supports S-MBR enforcement:

1. Operations and Management (OAM) configures the AMF with S-MBR support level by the RAN node(s) (e.g., base station(s) such as, e.g., gNB(s)).
2. Legacy (non-supporting) RAN node triggers failure of the procedure where S-MBR is included, the response message informs the AMF that it happened due to unknown Information Element (IE).
3. Supporting RAN node (e.g., base station such as, e.g., gNB) returns the S-MBR that is associated with a specific Single Network Slice Selection Assistance Information (S-NSSAI) that can be enforced or some other kind of 'ack' to the AMF in the appropriate message.
4. The RAN node (e.g., base station such as, e.g., gNB) indicates support for S-MBR in Next Generation (NG) setup procedure.
5. The RAN node (e.g., base station such as, e.g., gNB) indicates to the AMF the S-MBR instances that could not be enforced. Namely, the RAN node signals to the AMF information that allows the AMF to decide that the S-MBR for a specific S-NSSAI could not be enforced. Such lack of enforcement may be due to one or more of the following reasons
   a. lack of support at the RAN for the S-MBR enforcement functionality
   b. Enforcement of the S-MBR is not feasible due to, e.g., arrangements of channel groups at the RAN, which make it impossible to enforce a maximum bit rate for Guaranteed Bit Rate (GBR) and non-GBR traffic for traffic of a single S-NSSAI In one embodiment, the AMF notifies the SMF and the PCF on the S-MBR support of the RAN. The SMF checks if the S-MBR enforcement is supported and, if so, the SMF selects the same PCF for all PDU sessions of a UE in the same S-NSSAI.

In one embodiment, the PCF checks the S-MBR support of the RAN, then if S-MBR is not supported in RAN, the PCF ensures that the QoS parameters for the PDU sessions of a UE in a Slice does not exceed the S-MBR for the UE.

Certain embodiments may provide the technical advantage of enabling the control of the S-MBR per UE if the RAN does not support the enforcement of the S-MBR per UE.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC); however, the embodiments disclosed herein may be utilized in other types of similar cellular communications systems. In this example, the RAN includes base stations 102-1 and 102-2, which in the 5GS include NR base stations (gNBs) and optionally next generation eNBs (ng-eNBs) (e.g., LTE RAN nodes connected to the 5GC), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or RRHs, or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5G System (5GS) is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs and as such sometimes referred to herein as UEs 112, but the present disclosure is not limited thereto.

Figure 2:
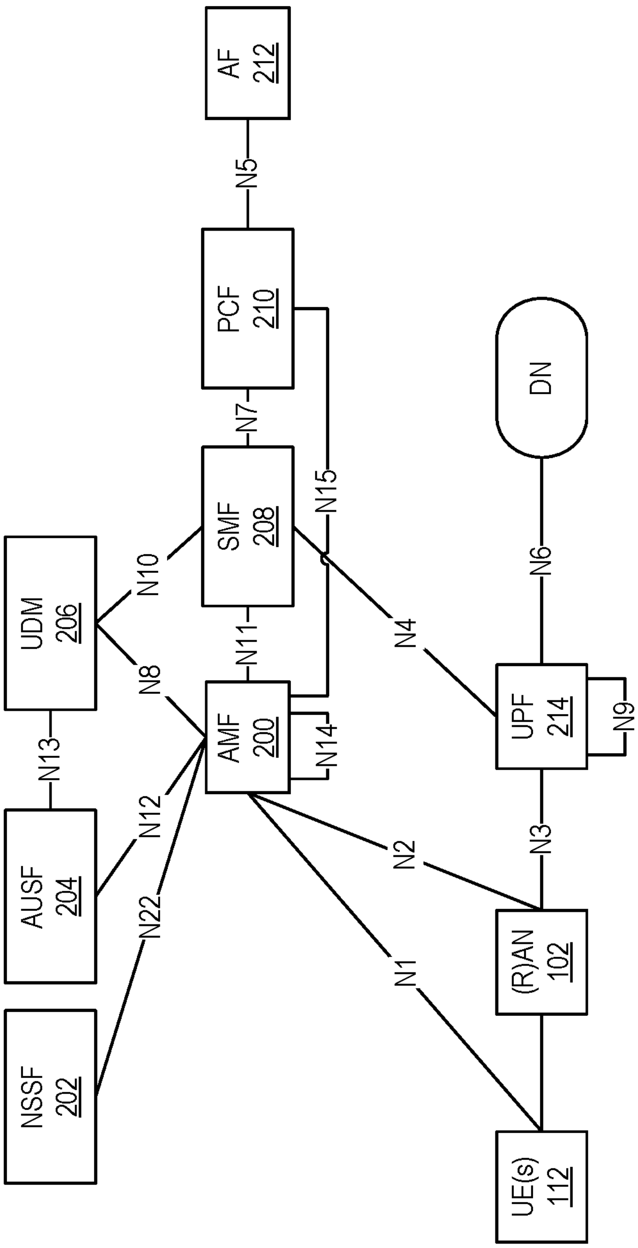
FIGS. 2 and 3 are representations of the cellular communications system of FIG. 1 as a Third Generation Partnership Project (3GPP) Fifth Generation System (5GS)

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an AMF 200. Typically, the R(AN) 102 comprises base stations, e.g. such as eNBs or gNBs or similar. Seen from the core network side, the 5GC NFs shown in FIG. 2 include a NSSF 202, an AUSF 204, a UDM 206, the AMF 200, a SMF 208, a PCF 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the AN 102 and AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating UP and CP. The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
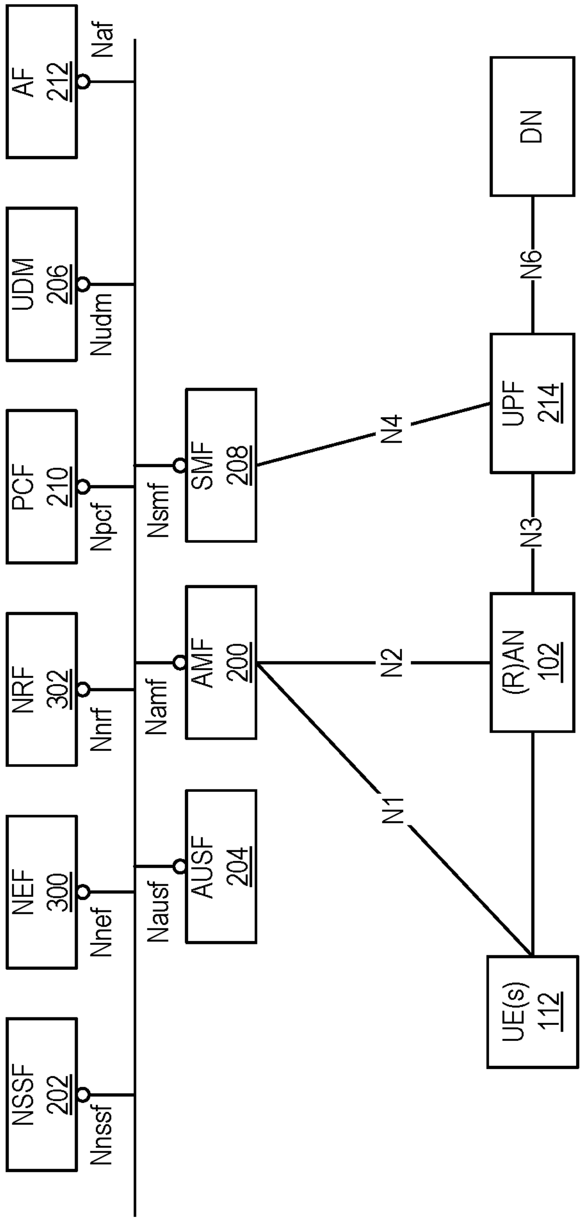

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support QoS. Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 4A:
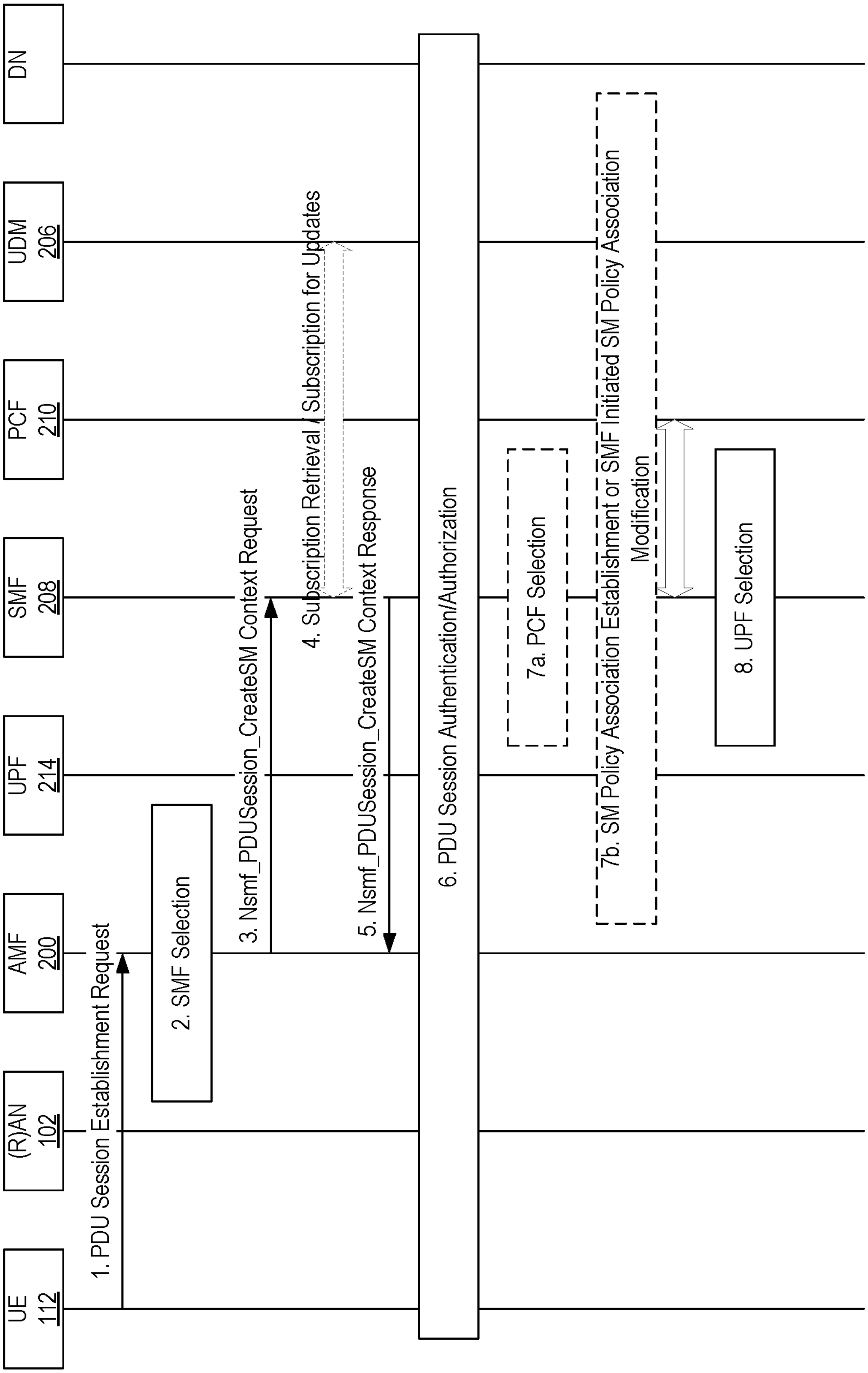
FIGS. 4A, 4B, and 4C illustrate a User Equipment (UE) requested Protocol Data Unit (PDU) Session Establishment procedure in non-roaming scenarios, in which a determination is made as to whether a Slice Maximum Bit Rate (S-MBR) is to be enforced in the Radio Access Network (RAN) or in the core network in accordance with one embodiment of the present disclosure.
Figure 4B:
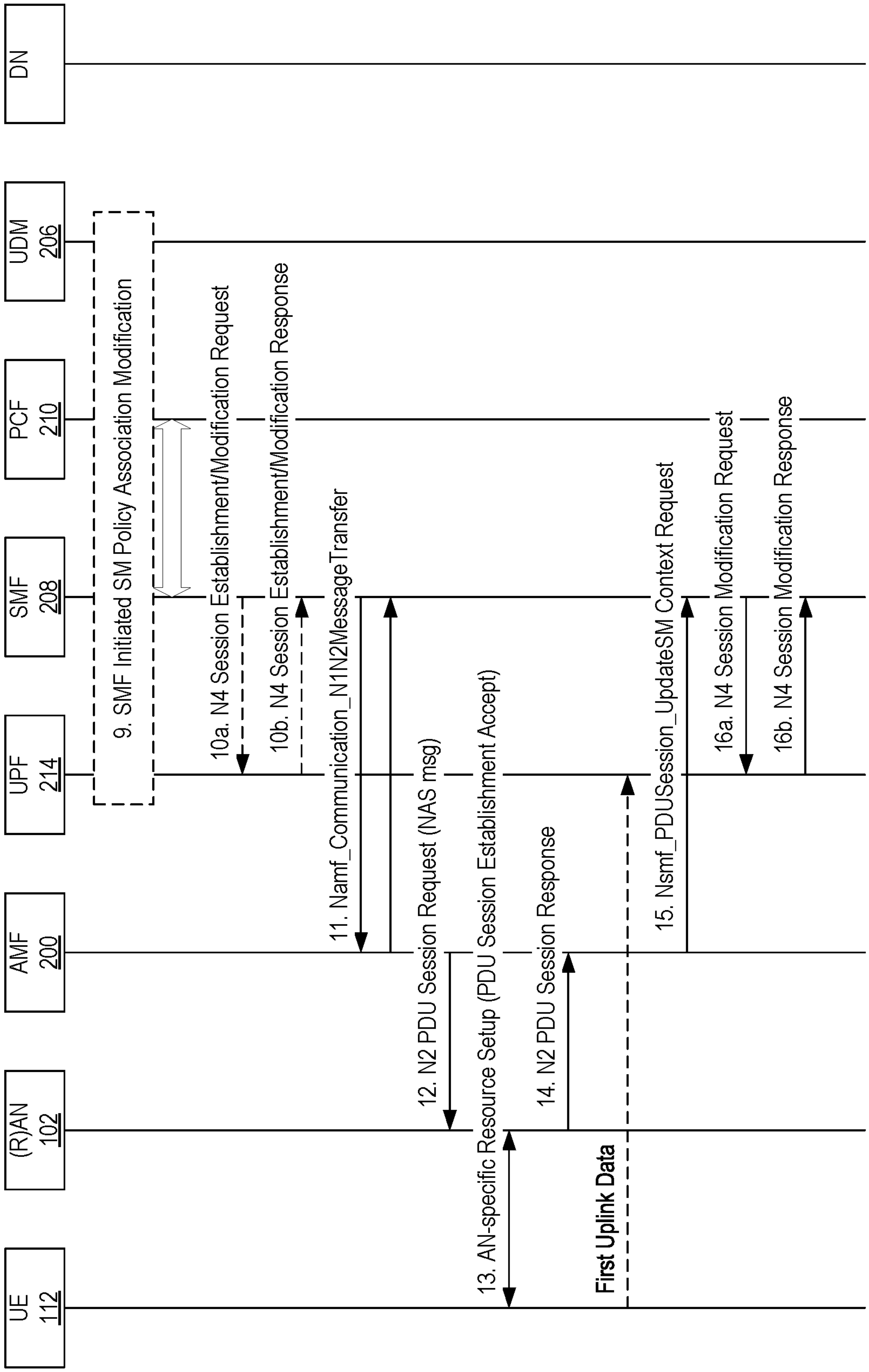
Figure 4C:
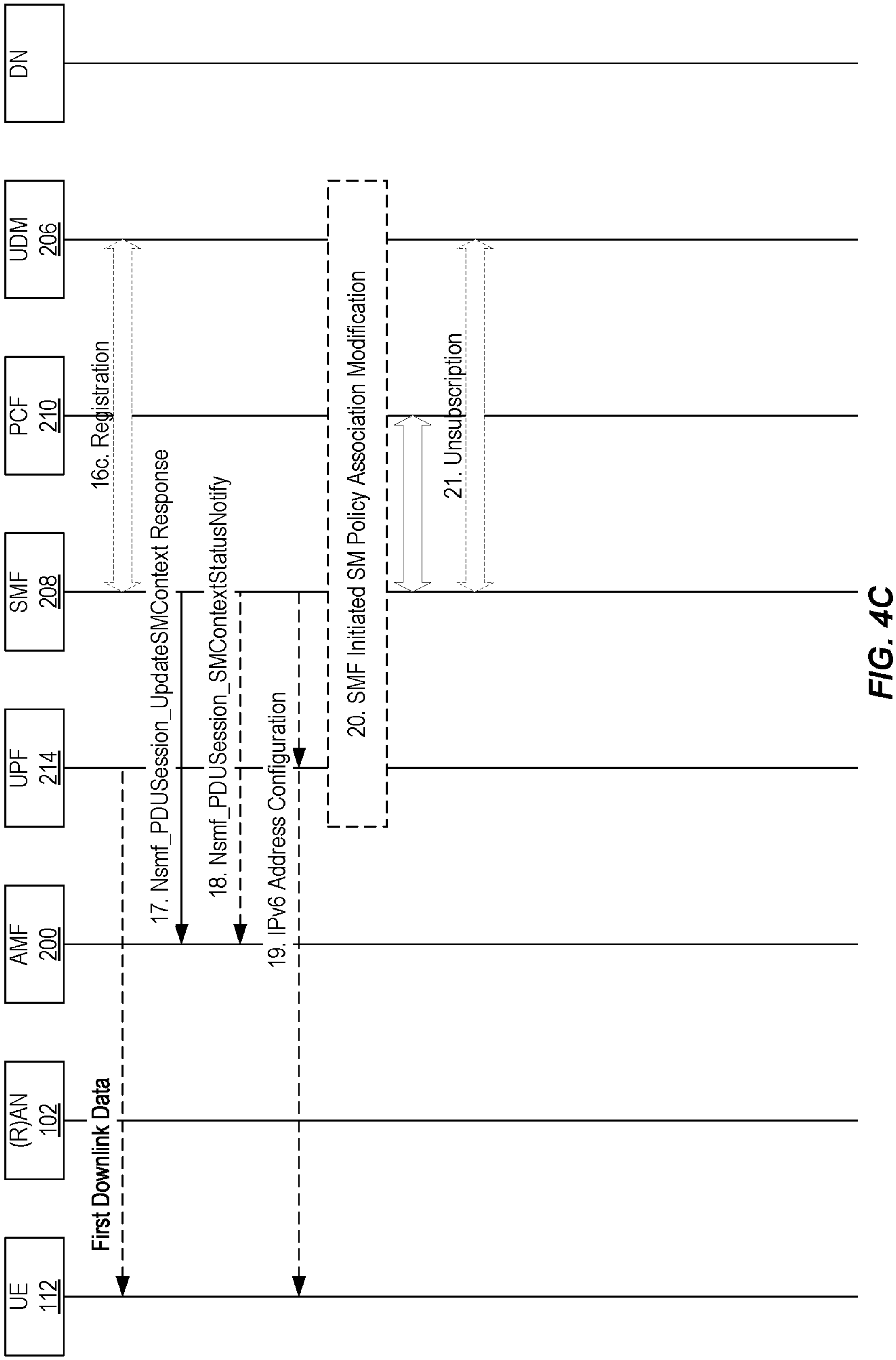

FIGS. 4A, 4B, and 4C illustrate a UE-requested PDU Session Establishment procedure in non-roaming scenarios, in accordance with one embodiment of the present disclosure. This procedure is the same as that described in 3GPP TS 23.502 subclause 4.3.2.2.1 and illustrated in FIG. 4.3.2.2.1-1 of 3GPP TS 23.502, but with the following extensions:

- Step 1: The UE 112 sends, to the AMF 200, a PDU Session Establishment Request.
- Step 2: The AMF 200 performs SMF selection. In this example, the AMF 200 selects the SMF 208.
- Step 3: In this step, the AMF 200 sends information to the SMF 208, where this information indicates whether the RAN (e.g., RAN node such as the base station 102 or gNB) supports S-MBR. In this particular example, this information is included in the Nsmf_PDUSession_CreateSMContext Request sent from the AMF 200 to the SMF 208.
  - The AMF 200 may obtain information about whether the RAN node (e.g., 102 or gNB) supports S-MBR enforcement in any desired manner. In one embodiment, the AMF 200 is configured (e.g., by OAM) with information that indicates whether the RAN node (e.g., base station 102 or gNB) supports S-MBR enforcement. This configuration may be, e.g., on the RAN node level (e.g., per RAN node). In another embodiment, the AMF 200 determines whether the RAN node supports S-MBR enforcement based on whether the RAN node (e.g., gNB) has triggered failure of a procedure where S-MBR IE is included in a message sent to the RAN node (see, e.g., FIG. 6 and the corresponding description below). In another embodiment, the AMF 200 determines whether the RAN node supports S-MBR enforcement based on the RAN node (e.g., if it supports S-MBR enforcement) returning the S-MBR that is associated with the specific S-NSSAI for which it supports S-MBR enforcement or some other kind of 'ack' to the AMF 200 in an appropriate message. In another embodiment, the RAN node indicates support or S-MBR to the AMF 200, e.g., in the NG setup procedure.
- Step 4: The SMF 208 retrieves subscription data for the UE 112 (for the Subscription Permanent Identifier (SUPI) of the UE 112, Data Network Name (DNN), and S-NSSAI) and/or subscribes for updates to the subscription data.
- Step 5: The SMF 208 sends a Nsmf_PDUSession_CreateSM Context Response to the AMF 200.
- Step 6: PDU session authentication/authorization is performed.

Step 7a: In this step, the SMF 208 selects a PCF 210 for the S-NSSAI if not already selected and reports the S-MBR support to the PCF 210. Note that if S-MBR enforcement is supported, the SMF 208 selects the same PCF 210 for all PDU sessions of the UE in the same network slice (i.e., the same S-NSSAI).

In one embodiment, based on the reported S-MBR support of the RAN, the PCF 210 determines whether to apply a mechanism at the PCF 210 to enforce the S-MBR for the UE 112. More specifically, in one embodiment, if the RAN supports (and is thus able to perform) S-MBR enforcement as indicated by the reported S-MBR support, the PCF 210 determines that the PCF 210 does not need to apply a mechanism to enforce the S-MBR for the UE 112 and operates accordingly (e.g., the PCF 210 does not monitor the QoS parameters of all PDU sessions of the UE 112 in the network slice are within the limits of the S-MBR for the UE 112). However, if the RAN does not support S-MBR enforcement as indicated by the reported S-MBR support, the PCF 210 determines that the PCF 210 does need to apply a mechanism to enforce the S-MBR for the UE 112 and operates accordingly (e.g., the PCF 210 monitors the QoS parameters of all PDU sessions of the UE 112 in the network slice are within the limits of the S-MBR for the UE 112).

Step 7b: The SMF 208 may perform a Session Management (SM) policy association establishment procedure to establish an SM policy association with the PCF 210 and get the default PCC rules or the PDU session or perform an SMF-initiated SM policy association modification procedure.

Step 8: The SMF 208 performs UPF selection.

Step 9: The SMF 208 may perform an SMF-initiated SM policy association modification procedure.

Steps 10a and 10b: If the request type indicates "initial request", the SMF 208 initiates an N4 Session Establishment procedure with the selected UPF(s); otherwise, it initiates an N4 Session Modification procedure with the selected UPF(s).

Step 11: The SMF 208 sends an Namf_Communication_N1N2MessageTransfer message to the AMF 200.

Step 12: The AMF 200 sends a PDU Session Request to the RAN 102.

Step 13: The RAN 102 may issue access network specific signaling exchange with the UE 112 for access network specific resource setup (i.e., a PDU Session Establishment Accept message).

Step 14: The RAN 102 sends a PDU Session Response message to the AMF 200.

Step 15: The AMF 200 sends an Nsmf_PDUSession_UpdateSM Context Request message to the SMF 208.

Step 16a: The SMF 208 initiates an N4 Session Modification procedure with the UPF 214.

Step 16b: The UPF 214 provides an N4 Session Modification Response to the SMF 208.

Step 16c: The SMF 208 may, in some cases, register with the UDM 206.

Step 17: The SMF 208 sends an Nsmf_PDUSession_UpdateSMContext Response to the AMF 200.

Step 18: The SMF 208 may also sends an Nsmf_PDUSession_SMContextStatusNotify message to the AMF 200.

Step 19: The SMF 208 may also send an IPv6 address configuration to the UE 112.

Step 20: The SMF 208 may perform an SMF-initiated SM Policy Association Modification procedure.

Step 21: The SMF 208 may unsubscribe from the UDM 206.

For the PDU session establishment for home routed scenarios, the AMF 200 reports RAN support of S-MBR to the V-SMF, and then the V-SMF reports this information to the H-SMF.

This can also be a capability of the Public Land Mobile Network (PLMN) in non-roaming. Then, the RAN support for S-MBR can be reported by the SMF 208 to the PCF 210 or a capability of the Visited PLMN (VPLMN) when roaming. Then, it is reported by the V-SMF to the H-SMF.

While not necessary for understanding embodiments of the present disclosure, for additional details of the steps and aspects of the procedure of FIGS. 4A-4C that are not directly related to embodiments of the present disclosure, the interested reader is directed to 3GPP TS 23.502 v17.0.0.

In one example embodiment, the SMF services are extended as follows where the extensions are indicated with underlined text:

Service operation name: Nsmf_PDUSession_Create.

Description: Create a new PDU Session in the H-SMF or SMF or create an association with an existing PDN connection in the home SMF+PGW-C.

Input, Required: SUPI, V-SMF ID or I-SMF ID, V-SMF SM Context ID or I-SMF SM Context ID, DNN, V-CN Tunnel Info or I-UPF Tunnel Info, addressing information allowing the H-SMF to request the V-SMF to issue further operations about the PDU Session or addressing information allowing the SMF to request the I-SMF to issue further operations about the PDU Session, Serving Network (PLMN ID, or PLMN ID and NID, see clause 5.18 of TS 23.501 [2]).

Input, Optional: S-NSSAI, PCO, Requested PDU Session Type, 5GSM Core Network Capability, Requested SSC mode, PDU Session ID, Number Of Packet Filters, UE location information, subscription get notified of PDU Session status change, PEI, GPSI, AN type, PCF ID, PCF Group ID, DNN Selection Mode, UE's Routing Indicator or UDM Group ID for the UE, Always-on PDU Session Requested, Control Plane CIoT 5GS Optimisation Indication, information provided by V-SMF related to charging in home routed scenario (see TS 32.255 [45]), AMF ID, EPS Bearer Status, extended NAS-SM timer indication, DNAI list supported by I-SMF (from I-SMF to SMF), HO Preparation Indication. MA PDU request indication, MA PDU Network-Upgrade Allowed indication, Indication on whether the UE is registered in both accesses; QoS constraints from the VPLMN (see clause 4.3.2.2.2), S-MBR support.

Service operation name: Nsmf_PDUSession_CreateSMContext.

Description: It creates an AMF-SMF association to support a PDU Session.

Input, Required: SUPI or PEI, DNN, AMF ID (AMF Instance ID), RAT Type, Serving Network (PLMN ID, or PLMN ID and NID, see clause 5.18 of TS 23.501 [2]).

Input, Optional: PEI, S-NSSAI(s), PDU Session Id, N1 SM container, UE location information, UE Time Zone, AN type, H-SMF identifier/address, list of alternative H-SMF(s) if available, old PDU Session ID (if the AMF also received an old PDU Session ID from the UE as specified in clause 4.3.5.2), Subscription For PDU Session Status Notification, Subscription for DDN Failure Notification, NEF Correlation ID, indication that the SUPI has not been authenticated, PCF ID, PCF Group ID, Same PCF Selection Indication, DNN Selection Mode, UE PDN Connection Context, GPSI, UE presence in LADN service area, GUAMI, backup AMF (s) (if NF Type is AMF), Trace Requirements, Control Plane CIoT 5GS Optimisation indication, Small Data Rate Control Status, APN Rate Control Status. Backup AMF(s) sent only once by the AMF to the SMF in its first interaction with the SMF, UE's Routing Indicator or UDM Group ID for the UE, EPS Bearer Status. Target ID (for EPS to 5GS handover), "Invoke NEF" flag, target DNAI, additional following three for SM context transfer: SMF transfer indication, Old SMF ID, SM context ID in old SMF (see clause 4.26.5.3), HO Preparation Indication. MA PDU request indication, MA PDU Network-Upgrade Allowed indication, Indication on whether the UE is registered in both accesses, Slice Maximum Bit Rate Enforcement indicator.

In one example embodiment, the PCF services are extended as follows where the extensions are indicated by underlined text:

Service operation name: Npcf_SMPolicyControl_Create.

Description: The NF Service Consumer can request the creation of a SM Policy Association and provide relevant parameters about the PDU Session to the PCF.

Inputs, Required: SUPI (or PEI in the case of emergency PDU Session without SUPI), PDU Session id, DNN, S-NSSAI and RAT Type.

Inputs, Optional: Information provided by the SMF as defined in clause 6.2.1.2 of TS 23.503 [20], such as Access Type, the IPv4 address and/or IPv6 prefix, PEI, GPSI, User Location Information, UE Time Zone, Serving Network (PLMN ID, or PLMN ID and NID, see clause 5.34 of TS 23.501 [2]), Charging Characteristics information, Session AMBR, subscribed default QoS information, Trace Requirements and Internal Group Identifier (see TS 23.501 [2], clause 5.9.7), NSI ID, DN Authorization Profile Index, Framed Route information. MA PDU Request indication, MA PDU Network-Upgrade Allowed indication, ATSSS capabilities of the MA PDU Session, QoS constraints from the VPLMN (see clause 4.3.2.2.2), Slice Maximum Bit Rate Enforcement indicator.

In case the RAN capabilities to support S-MBR change in the PDU session due to, e.g., mobility, the Nsmf and Npcf service operations for Update will transfer the S-MBR support/feasibility, i.e., Slice Maximum Bit Rate Enforcement Indicator, to the PCF 210.

An alternative method is that the AMF receives the Slice Maximum Bit Rate Enforcement Indicator from NG-RAN indicating whether the S-MBR enforcement is not supported or not feasible or supported and not feasible or supported and feasible. The AMF then decides to request the PCF to enforce the Slice MBR, if the indication from RAN is that S-MBR enforcement cannot be carried out at the RAN. This requires the AMF to send, in the Nsmf_PDUSession_CreateSMContext service operation (e.g., in step 3 of the process of FIGS. 4A, 4B, and 4C), the indication to monitor the Slice MBR, and then the SMF sends it to the PCF in the Npcf_SMPolicyControl_Create message (e.g., in step 7b of the process of FIGS. 4A, 4B, and 4C). The AMF may stop the request to the PCF to enforce the Slice MBR when the NG-RAN indicates in the Slice Maximum Bit Rate Enforcement Indicator that it becomes feasible.

Figure 5:
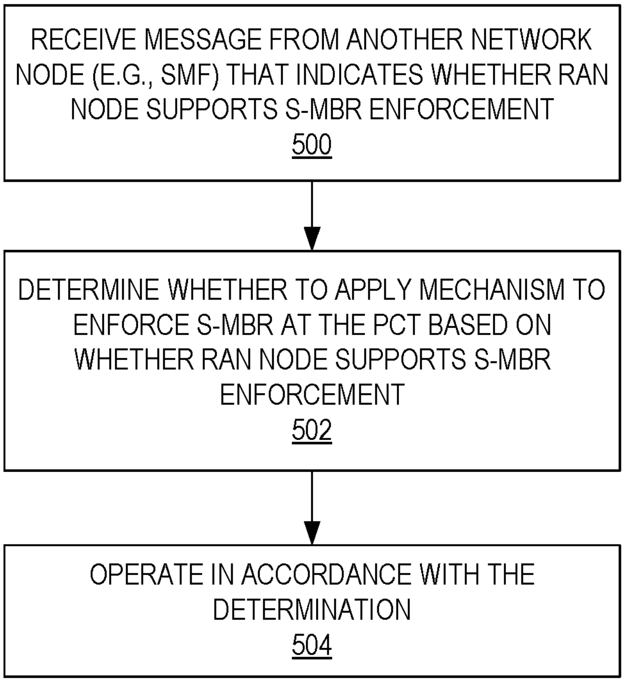
FIG. 5 is a flow chart that illustrates the operation of a Policy Control Function (PCF) in accordance with one embodiment of the present disclosure.

FIG. 5 is a flow chart that illustrates the operation of the PCF 210 in accordance with one embodiment of the present disclosure. As illustrated, the PCF 210 receives a message from another network node (e.g., the SMF 208) that indicates whether a RAN node (e.g., base station 102 or gNB) associated to a particular UE 112 supports S-MBR enforcement (step 500). The message may, for example, include a particular parameter or information element that indicates whether the RAN node associated to the particular UE 112 supports S-MBR enforcement. Note that the parameter or information element may directly indicate whether the RAN node associated to a particular UE 112 supports S-MBR enforcement. Alternatively, the parameter or information element may be present if the RAN node associated to the particular UE 112 supports S-MBR enforcement or absent if the RAN node associated to the particular UE 112 does not support S-MBR enforcement, or vice versa. In one embodiment, the message received in step 500 is the message of step 3 of FIG. 4A; however, the present disclosure is not limited thereto.

The PCF 210 determines whether a mechanism for enforcing the S-MBR of the UE 112 is to be performed by the PCF 210 based on whether the RAN node associated to the UE 112 supports S-MBR enforcement, as indicated by the received message or step 500 (step 502). The PCF 210 then operates in accordance with the determination made in step 502 (step 504). More specifically, if the RAN supports (and is thus able to perform) S-MBR enforcement, the PCF 210 does not apply the mechanism to enforce the S-MBR for the UE 112 (e.g., the PCF 210 does not monitor the QoS parameters of all PDU sessions of the UE 112 in the network slice are within the limits of the S-MBR for the UE 112). However, if the RAN does not support S-MBR enforcement, the PCF 210 applies the mechanism to enforce the S-MBR for the UE 112 (e.g., the PCF 210 monitors the QoS parameters of all PDU sessions of the UE 112 in the network slice are within the limits of the S-MBR for the UE 112).

Note that while the PCF 210 is described here as the core network node that determines whether to apply a mechanism (s) to enforce the S-MBR in the core network or in the RAN in the example embodiments described herein, this decision may alternatively be made by some other network node such as, e.g., the AMF 200 or the SMF 208. This other network node may, e.g., then inform, instruct, or configure the PCF 210 to enforce the S-MBR.

Figure 6:
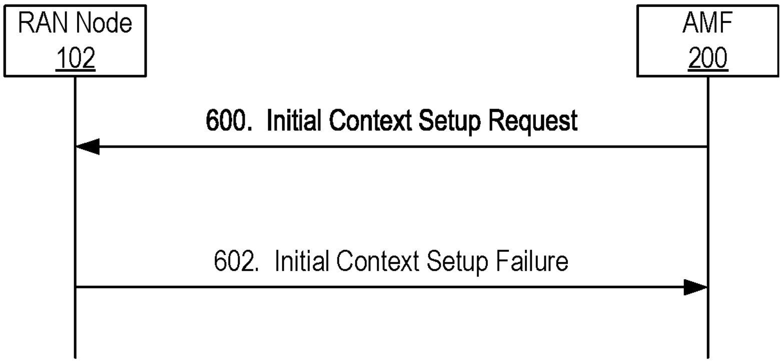
FIG. 6 illustrates an example embodiment of the present disclosure in which an Access and Mobility Management Function (AMF) determines that the RAN does not support enforcement of S-MBR based on receipt of an Initial UE Context Setup Failure message.

The following text described option #2 described in the Summary section above (i.e., the option where Legacy (non-supporting) gNB triggers failure of the procedure where S-MBR is included, the response message informs the AMF that it happened due to unknown IE). FIG. 6 depicts on example of the failed Initial UE Context Setup procedure in which the AMF 200 sends an INITIAL UE CONTEXT SETUP REQUEST message to a RAN node 102 (step 600), and the RAN node 102 responds with an INITIAL UE CONTEXT SETUP FAILURE message (step 602). In this case, the INITIAL UE CONTEXT SETUP REQUEST message includes the new Information Element (IE) S-MBR that is not supported by the NG-RAN node (e.g., base station 102 or gNB).

The Initial Context Setup Request message is sent by the AMF 200 to the NG-RAN node (e.g., the base station 102 or gNB) to request the setup of a UE context. In one example embodiment, the Initial Context Setup Request message includes the new Information Element (IE) S-MBR that is not supported by the NG-RAN node, as shown below as a revision to Section 9.2.2.1 of 3GPP TS 38.413V 16.7.0.

In this embodiment, the S-MBR signaled from the core network (CN) to the RAN is intended to refer only to network slices for which PDU Sessions with an active user plane are established at the RAN. Namely, PDU Sessions to which user plane (UP) resources have been allocated.

In another embodiment, the S-MBR may be signaled to the RAN for network slices that do not have an active UP connection at the RAN. For example, the S-MBR may be signaled for network slices included in the list of slices configured for the UE, also known as Configured NSSAI, or for network slices included in the list of slices allowed for the UE, also known as Allowed NSSAI.

*** Start Revision of Section 9.2.2.1 of 3GPP TS 38.413V 16.7.0 ***

INITIAL CONTEXT SETUP REQUEST

This message is sent by the AMF to request the setup of a UE context. The direction of the message is from the AMF to the NG-RAN node.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| Old AMF | O | | AMF Name 9.3.3.21 | | YES | reject |
| UE Aggregate Maximum Bit Rate | C-ifPDUsessionResourceSetup | | 9.3.1.58 | | YES | reject |
| Core Network Assistance Information for RRC INACTIVE | O | | 9.3.1.15 | | YES | ignore |
| GUAMI | M | | 9.3.3.3 | | YES | reject |
| PDU Session Resource Setup Request List | | 0 . . . 1 | | | YES | reject |
| >PDU Session Resource Setup Request Item | | 1 . . . <maxnoofPDUSessions> | | | — | |
| >>PDU Session ID | M | | 9.3.1.50 | | — | |
| >>PDU Session NAS-PDU | O | | NAS-PDU 9.3.3.4 | | — | |
| >>S-NSSAI | M | | 9.3.1.24 | | — | |
| >>PDU Session Resource Setup Request Transfer | M | | OCTET STRING | Containing the PDU Session Resource Setup Request Transfer IE specified in subclause 9.3.4.1. | — | |
| Allowed NSSAI | M | | 9.3.1.31 | Indicates the S-NSSAIS permitted by the network | YES | reject |
| S-MBR List | | 0 . . . 1 | | | YES | reject |
| >S-MBR Value List Item | | 1 . . . <MaxNumberofS-MBRvalues> | | | | |
| >>S-NSSAI | M | | 9.3.1.24 | | | |
| >>S-MBR Value | M | | 9.3.1.x | | | |
| UE Security Capabilities | M | | 9.3.1.86 | | YES | reject |
| Security Key | M | | 9.3.1.87 | | YES | reject |
| Trace Activation | O | | 9.3.1.14 | | YES | ignore |
| Mobility Restriction List | O | | 9.3.1.85 | | YES | ignore |
| UE Radio Capability | O | | 9.3.1.74 | | YES | ignore |
| Index to RAT/Frequency Selection Priority | O | | 9.3.1.61 | | YES | ignore |
| Masked IMEISV | O | | 9.3.1.54 | | YES | ignore |
| NAS-PDU | O | | 9.3.3.4 | | YES | ignore |
| Emergency Fallback Indicator | O | | 9.3.1.26 | | YES | reject |
| RRC Inactive Transition Report Request | O | | 9.3.1.91 | | YES | ignore |
| UE Radio Capability for Paging | O | | 9.3.1.68 | | YES | ignore |
| Redirection for Voice EPS Fallback | O | | 9.3.1.116 | | YES | ignore |

-continued

*** Start Revision of Section 9.2.2.1 of 3GPP TS 38.413V 16.7.0 ***
INITIAL CONTEXT SETUP REQUEST
This message is sent by the AMF to request the setup of a UE context. The direction of the message is from the AMF to the NG-RAN node.

| IE/Group Name | Presence | Range | IE type and reference | Semantics description | Criticality | Assigned Criticality |
|---|---|---|---|---|---|---|
| Location Reporting Request Type | O | | 9.3.1.65 | | YES | ignore |
| CN Assisted RAN Parameters Tuning | O | | 9.3.1.119 | | YES | ignore |
| SRVCC Operation Possible | O | | 9.3.1.128 | | YES | ignore |
| IAB Authorized | O | | 9.3.1.129 | | YES | ignore |
| Enhanced Coverage Restriction | O | | 9.3.1.140 | | YES | ignore |
| Extended Connected Time | O | | 9.3.3.31 | | YES | ignore |
| UE Differentiation Information | O | | 9.3.1.144 | | YES | ignore |
| NR V2X Services Authorized | O | | 9.3.1.146 | | YES | ignore |
| LTE V2X Services Authorized | O | | 9.3.1.147 | | YES | ignore |
| NR UE Sidelink Aggregate Maximum Bit Rate | O | | 9.3.1.148 | This IE applies only if the UE is authorized for NR V2X services. | YES | ignore |
| LTE UE Sidelink Aggregate Maximum Bit Rate | O | | 9.3.1.149 | This IE applies only if the UE is authorized for LTE V2X services. | YES | ignore |
| PC5 QoS Parameters | O | | 9.3.1.150 | This IE applies only if the UE is authorized for NR V2X services. | YES | ignore |
| CE-mode-B Restricted | O | | 9.3.1.155 | | YES | ignore |
| UE User Plane CIoT Support Indicator | O | | 9.3.1.160 | | YES | ignore |
| RG Level Wireline Access Characteristics | O | | OCTET STRING | Specified in TS 23.316 [34]. Indicates the wireline access technology specific QoS information corresponding to a specific wireline access subscription. | YES | ignore |
| Management Based MDT PLMN List | O | | MDT PLMN List 9.3.1.168 | | YES | ignore |
| UE Radio Capability ID | O | | 9.3.1.142 | | YES | reject |

*** End Revised Version of Section 9.2.2.1 of 3GPP TS 38.413V 16.7.0 ***

In the Initial UE Context Setup Request message, the S-MBR IE can be encoded with Criticality set to 'YES' and Assigned criticality set to 'reject'. In this case, a NG-RAN node that does not support that IE will respond to the AMF 200 with an Initial Context Setup Failure message indicating in the Criticality Diagnostics that the reason for failure is due to unknown new IE S-MBR.

The Initial Context Setup Failure message is sent by the NG-RAN node (e.g., the base station 102 or gNB) to the AMF 200 to indicate that the setup of the UE context was unsuccessful. In one example embodiment, the Initial Context Setup Request message includes the following information, as defined in Section 9.2.2.3 of 3GPP TS 38.413V 16.7.0:

-continued

Start Addition of Section 9.3.1.x to 3GPP TS 38.413V 16.7.0
9.3.1.x UE-Slice MBR
This IE defines the rate limit per UE per slice as specified in 23.501 [9].

| IE/Group Name | Presence | Range | IE type and reference | Semantics description |
|---|---|---|---|---|
| | | | | the downlink direction. |
| >Slice Maximum Bit Rate Uplink | M | | Bit Rate 9.3.1.4 | This IE indicates the Slice Maximum Bit |

*** Start Excerpt from Section 9.2.2.3 of 3GPP TS 3GPP TS 38.413V 16.7.0 ***

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | ignore |
| RAN UE NGAP ID | M | | 9.3.3.2 | | YES | ignore |
| PDU Session Resource Failed to Setup List | | 0 . . . 1 | | | YES | ignore |
| >PDU Session Resource Failed to Setup Item | | 1 . . . <maxnoofPDUSessions> | | | — | |
| >>PDU Session ID | M | | 9.3.1.50 | | — | |
| >>PDU Session Resource Setup Unsuccessful Transfer | M | | OCTET STRING | Containing the PDU Session Resource Setup Unsuccessful Transfer IE specified in subclause 9.3.4.16. | — | |
| Cause | M | | 9.3.1.2 | | YES | ignore |
| Criticality Diagnostics | O | | 9.3.1.3 | | YES | ignore |

*** End Excerpt from Section 9.2.2.3 of 3GPP TS 38.413V 16.7.0 ***

In one embodiment, the UE-Slice MBR IE defines the rate limit per UE per slice as specified in 3GPP 23.501. In one example embodiment, this is expressed as the following addition to 3GPP TS 38.413V 16.7.0:

Start Addition of Section 9.3.1.x to 3GPP TS 38.413V 16.7.0
9.3.1.x UE-Slice MBR
This IE defines the rate limit per UE per slice as specified in 23.501 [9].

| IE/Group Name | Presence | Range | IE type and reference | Semantics description |
|---|---|---|---|---|
| Slice Maximum Bit Rate | | 1 | | |
| >Slice Maximum Bit Rate Downlink | M | | Bit Rate 9.3.1.4 | This IE indicates the Slice Maximum Bit Rate as specified in TS 23.501 [9] in |

-continued

Start Addition of Section 9.3.1.x to 3GPP TS 38.413V 16.7.0
9.3.1.x UE-Slice MBR
This IE defines the rate limit per UE per slice as specified in 23.501 [9].

| IE/Group Name | Presence | Range | IE type and reference | Semantics description |
|---|---|---|---|---|
| | | | | Rate as specified in TS 23.501 [9] in the uplink direction. |

*** End Addition of Section 9.3.1.x to 3GPP TS 38.413V 16.7.0 ***

Figure 7:
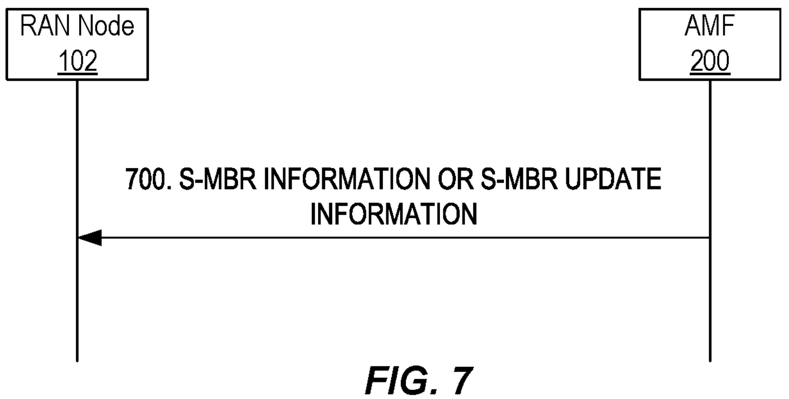
FIG. 7 illustrates a procedure in which an AMF signals, to a RAN node, a S-MBR or S-MBR information update in accordance with an embodiment of the present disclosure.
Figure 8:
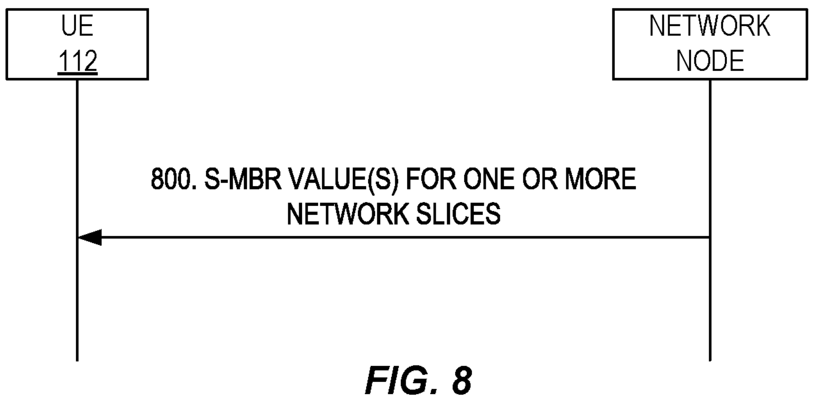
FIG. 8 illustrates a procedure in which an S-MBR is signaled to a UE in accordance with an embodiment of the present disclosure.

It should be noted that addition of the S-MBR information in the Initial Context Setup Request as described above with respect to FIG. 6 is only an example. In one embodiment, the AMF 200 signals and updates the S-MBR to the NG-RAN node as part of UE context. Therefore, the S-MBR may be signaled or updated whenever PDU Session Resource modifications are signaled from the AMF 200 to the NG-RAN node or whenever UE context modifications are signaled from the AMF 200 to the NG-RAN node. This is illustrated in FIG. 7 where the AMF 200 signals, to an NG-RAN node, a message that comprises S-MBR information or a S-MBR information update for one or more networks slices (NS-SAIs) (step 700). As an example, the S-MBR (or S-MBR update) may be signaled from the AMF 200 to NG-RAN node in the NG PDU Session Resource Setup Request, PDU Session Resource Modify Request, UE Context Modification Request, Handover Request. Additionally, the S-MBR may be signaled to the UE also as part of the DL NAS Transport. The latter may be needed to enable informing the NG-RAN node of the S-MBR when NAS signaling is sent to the UE, which may for example update the S-MBR at the UE. Signaling of the S-MBR to the UE is illustrated in FIG. 8, where a network node sends, to the UE, a message that comprises S-MBR information that comprises a S-MBR value(s) (e.g., DL or UL S-MBR values) for one or more network slices (step 800).

An alternative embodiment concerning how the RAN (e.g., RAN nodes such as, e.g., a base station 102) can inform the AMF 200 about the fact that the S-MBR associated to a given S-NSSAI and/or PDU Session cannot be enforced is explained below with respect to FIG. 9.

Figure 9:
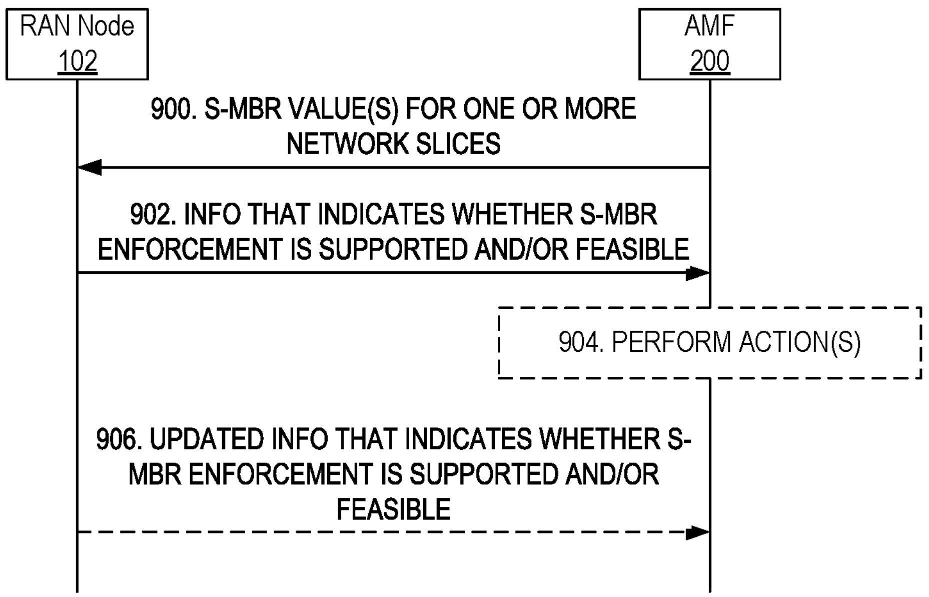
FIG. 9 illustrates another embodiment of a procedure by which the AMF is able to determine whether the RAN supports S-MBR enforcement.

As illustrated in FIG. 9, in this embodiment, the RAN node receives S-MBR value(s) for one or more network slices (e.g., one or more NSSAIs) (step 900). In one embodiment, it can either be assumed that the S-MBR(s) is(are) received by the RAN node for one or more S-NSSAIs included in the Allowed NSSAI list signaled from the AMF 200 to the RAN node or that the RAN node receives the S-MBR for slices that have an active UP, namely the S-MBR is signaled independently from the Allowed NSSAI and in procedures where the UE context and/or PDU Session information are setup and updated (as explained above).

After receiving an S-MBR for an S-NSSAI, the RAN node is able to reply to the AMF 200 with information indicating that the S-MBR enforcement is supported/not-supported and/or that S-MBR enforcement is feasible/not-feasible (step 902). The latter is achieved by allowing the RAN node to signal, for each PDU Session for which an active user plane is established, an information element (IE) expressing that enforcement of the S-MBR is supported or not-supported or feasible or not feasible or supported but not feasible. The AMF 200 may then perform one or more actions based on the received IE from the RAN node (step 904). As discussed below in further detail, the RAN node may, in some embodiments, subsequently send information to the AMF that indicates an update for whether S-MBR enforcement is supported/non-supported at the RAN node and/or that S-MBR enforcement is feasible/not-feasible at the RAN node (step 906). For example, if the RAN node indicates that S-MBR enforcement is supported and feasible in step 902 but subsequently something changes such that S-MBR enforcement is no longer supported and/or no longer feasible, the information sent in step Y906 would indicate that S-MBR enforcement is no longer supported and/or no longer feasible.

An example of how the IE of step 902 (and optionally of step 906) from the RAN node can be encoded is shown below:

Start Addition of Section 9.3.1.y to 3GPP TS 3GPP TS 38.413V 16.7.0
9.3.1.y Slice Maximum Bit Rate Enforcement Indicator
This IE indicates whether enforcement of the Slice Maximum Bit Rate is possible.

| IE/Group Name | Presence | Range | IE type and reference | Semantics description |
|---|---|---|---|---|
| Slice Maximum Bit Rate Enforcement Indicator | M | | ENUMERATED (not-feasible, not-supported, supported-feasible . . . ) | |

*** End Addition of Section 9.3.1.y to 3GPP TS 38.413V 16.7.0 ***

In the example above, it is assumed that, if the IE is not received by the AMF, the RAN node does not support the S-MBR enforcement indicator IE and the functionality associated to it. On the contrary, if the IE is received by the AMF, then the AMF can learn that 1) Enforcement of the S-MBR is not supported. As a consequence of this, the AMF can, e.g., in step 904, trigger mechanisms like those described in previous embodiments, to allow the monitoring and enforcement of the S-MBR via the PCF. The AMF in this case may also decide (e.g., in step 904) not to signal the S-MBR to the RAN anymore, either for all the S-NSSAIs the UE is allowed to access, or only for the S-NSSAI for which S-MBR enforcement was declared not to be supported.
2) Enforcement of the S-MBR is not feasible. As a consequence of this, the AMF can, e.g., in step 904, trigger mechanisms like those described in previous embodiments, to allow the monitoring and enforcement of the S-MBR via the PCF. In this case, the AMF may decide to signal again the S-MBR to the RAN, for the S-NSSAI and/or PDU Session for which the "not-feasible" indication was received. In this way, the AMF could learn whether enforcement of the S-MBR for the S-NSSAI and PDU Session in question became feasible. If enforcement became feasible, the AMF may stop enforcement of the S-MBR enforcement at the PCF.
3) Enforcement of the S-MBR is supported and feasible. This helps the AMF distinguish between cases when the RAN does not support the Slice Maximum Bit Rate Enforcement Indicator IE and its functionality (in which case the RAN would not signal the Slice Maximum Bit Rate Enforcement Indicator IE) and cases when the RAN can enforce the S-MBR. As a consequence, the AMF may, e.g., in step 904, avoid to trigger S-MBR enforcement at the PCF.

In an alternative example, the IE above may only include values "not-feasible, not-supported", with the understanding that, if the AMF does not receive the IE, it means that the RAN is able to enforce the S-MBR. The latter may need to be complemented with a configuration at the AMF (e.g., from the OAM system) indicating whether a RAN node supports the S-MBR enforcement indicator IE and its functionality. With such configuration, the AMF would be able to distinguish between cases when the RAN does not signal the Slice Maximum Bit Rate Enforcement Indicator because the S-MBR could be enforced and cases when cases when the RAN does not signal the Slice Maximum Bit Rate Enforcement Indicator because the IE and its functionality is supported.

Examples of how the RAN may signal (e.g., in step 902) an indication of supported/not-supported/feasible/not-feasible S-MBR enforcement to the AMF are described below.

In one example, it is assumed that the Slice Maximum Bit Rate Enforcement Indicator IE described above is included as part of relevant NGAP messages from RAN to AMF. This IE may be added in messages from RAN to the AMF where successful establishment of user plane resources for a PDU session is signaled. Such messages are described in the example modified sections of 3GPP TS 38.413V 16.7.0 below. If the Slice Maximum Bit Rate Enforcement Indicator IE is included in one of the messages indicated below, the AMF, if supported, deduces that enforcement of the slice maximum bit rate is not possible for the concerned PDU Session and S-NSSAI and it may use this information to determine whether alternative slice maximum bit rate methods can be enabled, i.e., via PCF.

*** Start Revised Version of Section 9.2.1.2 of 3GPP TS 38.413V 16.7.0 ***

9.2.1.2 PDU SESSION RESOURCE SETUP RESPONSE

This message is sent by the NG-RAN node as a response to the request to assign resources on Uu and NG-U for one or several PDU session resources.

Direction: NG-RAN node → AMF

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | ignore |
| RAN UE NGAP ID | M | | 9.3.3.2 | | YES | ignore |
| PDU Session Resource Setup Response List | | 0 . . . 1 | | | YES | ignore |
| >PDU Session Resource Setup Response Item | | 1 . . . <maxnoofPDUSessions> | | | — | |
| >>PDU Session ID | M | | 9.3.1.50 | | — | |
| >>PDU Session Resource Setup Response Transfer | M | | OCTET STRING | Containing the PDU Session Resource Setup Response Transfer IE specified in subclause 9.3.4.2. | — | |
| <u>>>Slice Maximum Bit Rate Enforcement Indicator</u> | <u>O</u> | | <u>9.3.1.y</u> | | | |
| PDU Session Resource Failed to Setup List | | 0 . . . 1 | | | YES | ignore |
| >PDU Session Resource Failed to Setup Item | | 1 . . . <maxnoofPDUSessions> | | | — | |
| >>PDU Session ID | M | | 9.3.1.50 | | — | |
| >>PDU Session Resource Setup Unsuccessful Transfer | M | | OCTET STRING | Containing the PDU Session Resource Setup Unsuccessful Transfer IE specified in subclause 9.3.4.16. | — | |
| Criticality Diagnostics | O | | 9.3.1.3 | | YES | ignore |

| Range bound | Explanation |
|---|---|
| maxnoofPDUSessions | Maximum no. of PDU sessions allowed towards one UE. Value is 256. |

*** End Revised Version of Section 9.2.1.2 of 3GPP TS 38.413V 16.7.0 ***

*** Start Revised Version of Section 9.2.1.6 of 3GPP TS 38.413V 16.7.0 ***
9.2.1.6 PDU SESSION RESOURCE MODIFY RESPONSE
This message is sent by the NG-RAN node and is used to report the outcome of the request from the PDU SESSION RESOURCE MODIFY REQUEST message.
Direction: NG-RAN node → AMF

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | ignore |
| RAN UE NGAP ID | M | | 9.3.3.2 | | YES | ignore |
| PDU Session Resource Modify Response List | | 0 . . . 1 | | | YES | ignore |
| >PDU Session Resource Modify Response Item | | 1 . . . <maxnoofPDUSessions> | | | — | |
| >>PDU Session ID | M | | 9.3.1.50 | | — | |
| >>PDU Session Resource Modify Response Transfer | M | | OCTET STRING | Containing the PDU Session Resource Modify Response Transfer IE specified in subclause 9.3.4.4. | — | |
| >>Slice Maximum Bit Rate Enforcement Indicator | O | | 9.3.1.y | | | |
| PDU Session Resource Failed to Modify List | | 0 . . . 1 | | | YES | ignore |
| >PDU Session Resource Failed to Modify Item | | 1 . . . <maxnoofPDUSessions> | | | — | |
| >>PDU Session ID | M | | 9.3.1.50 | | — | |
| >>PDU Session Resource Modify Unsuccessful Transfer | M | | OCTET STRING | Containing the PDU Session Resource Modify Unsuccessful Transfer IE specified in subclause 9.3.4.17. | — | |
| User Location Information | O | | 9.3.1.16 | | YES | ignore |
| Criticality Diagnostics | O | | 9.3.1.3 | | YES | ignore |

| Range bound | Explanation |
|---|---|
| maxnoofPDUSessions | Maximum no. of PDU sessions allowed towards one UE. Value is 256. |

*** End Revised Version of Section 9.2.1.6 of 3GPP TS 38.413V 16.7.0 ***

When RAN replies to CN/AMF that enforcement of S-MBR is not feasible (e.g., in step 902 of the process of FIG. 9), the RAN can store the initial request for S-MBR enforcement for a particular S-NSSAI. If the conditions in RAN change enabling RAN to enforce the S-MBR for that S-NSSAI, the RAN can inform CN/AMF that S-MBR enforcement for that S-NSSAI is feasible (e.g., in step 906). This can be done using the PDU Session Resource Notify message as shown below. Furthermore, at that stage, RAN can either start S-MBR enforcement or alternatively, wait for explicit indication from the CN/AMF whether to start RAN S-MBR enforcement. Whether the former or the latter is to be conducted may be further dependent on additional new information provided by the CN/AMF when the request for S-MBR enforcement was provided by CN/AMF to RAN.

*** Start Revised Version of Section 9.2.1.7 of 3GPP TS 38.413V 16.7.0 ***

9.2.1.7 PDU SESSION RESOURCE NOTIFY

This message is sent by the NG-RAN node to notify that the QoS requirements of already established GBR QoS flow(s) for which notification control has been requested are either not fulfilled anymore or fulfilled again by the NG-RAN node. This message can also be sent by the NG-RAN node to notify that PDU session resource(s) for a given UE are released.

Direction: NG-RAN node → AMF

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| AMF UE NGAP ID | M | | 9.3.3.1 | | YES | reject |
| RAN UE NGAP ID | M | | 9.3.3.2 | | YES | reject |
| PDU Session Resource Notify List | | 0 . . . 1 | | | YES | reject |
| >PDU Session Resource Notify Item | | 1 . . . <maxnoofPDUSessions> | | | — | |
| >>PDU Session ID | M | | 9.3.1.50 | | — | |
| >>PDU Session Resource Notify Transfer | M | | OCTET STRING | Containing the PDU Session Resource Notify Transfer IE specified in subclause 9.3.4.5. | — | |
| >>Slice Maximum Bit Rate Enforcement Indicator | O | | 9.3.1.y | | | |
| PDU Session Resource Released List | | 0 . . . 1 | | | YES | ignore |
| >PDU Session Resource Released Item | | 1 . . . <maxnoofPDUSessions> | | | — | |
| >>PDU Session ID | M | | 9.3.1.50 | | — | |
| >>PDU Session Resource Notify Released Transfer | M | | OCTET STRING | Containing the PDU Session Resource Notify Released Transfer IE specified in subclause 9.3.4.13. | — | |
| User Location Information | O | | 9.3.1.16 | | YES | ignore |

| Range bound | Explanation |
|---|---|
| maxnoofPDUSessions | Maximum no. of PDU sessions allowed towards one UE. Value is 256. |

*** End Revised Version of Section 9.2.1.7 of 3GPP TS 38.413V 16.7.0 ***

*** Start Revised Version of Section 9.2.2.2 of 3GPP TS 38.413V 16.7.0 ***

9.2.2.2 INITIAL CONTEXT SETUP RESPONSE

This message is sent by the NG-RAN node to confirm the setup of a UE context.

Direction: NG-RAN node → AMF

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | ignore |
| RAN UE NGAP ID | M | | 9.3.3.2 | | YES | ignore |

-continued

*** Start Revised Version of Section 9.2.2.2 of 3GPP TS 38.413V 16.7.0 ***

9.2.2.2 INITIAL CONTEXT SETUP RESPONSE

This message is sent by the NG-RAN node to confirm the setup of a UE context.

Direction: NG-RAN node → AMF

| | | | | | | |
|---|---|---|---|---|---|---|
| PDU Session Resource Setup Response List | | 0 . . . 1 | | | YES | ignore |
| >PDU Session Resource Setup Response Item | | 1 . . . <maxnoofPDUSessions> | | | — | |
| >>PDU Session ID | M | | 9.3.1.50 | | — | |
| >>PDU Session Resource Setup Response Transfer | M | | OCTET STRING | Containing the PDU Session Resource Setup Response Transfer IE specified in subclause 9.3.4.2. | — | |
| >>Slice Maximum Bit Rate Enforcement Indicator | O | | 9.3.1.y | | | |
| PDU Session Resource Failed to Setup List | | 0 . . . 1 | | | YES | ignore |
| >PDU Session Resource Failed to Setup Item | | 1 . . . <maxnoofPDUSessions> | | | — | |
| >>PDU Session ID | M | | 9.3.1.50 | | — | |
| >>PDU Session Resource Setup Unsuccessful Transfer | M | | OCTET STRING | Containing the PDU Session Resource Setup Unsuccessful Transfer IE specified in subclause 9.3.4.16. | — | |
| Criticality Diagnostics | O | | 9.3.1.3 | | YES | ignore |

| Range bound | Explanation |
|---|---|
| maxnoofPDUSessions | Maximum no. of PDU sessions allowed towards one UE. Value is 256. |

*** End Revised Version of Section 9.2.2.2 of 3GPP TS 38.413V 16.7.0 ***

*** Start Revised Version of Section 9.2.3.5 of 3GPP TS 38.413V 16.7.0 ***

9.2.3.5 HANDOVER REQUEST ACKNOWLEDGE

This message is sent by the target NG-RAN node to inform the AMF about the prepared resources at the target.

Direction: NG-RAN node → AMF.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | ignore |
| RAN UE NGAP ID | M | | 9.3.3.2 | Allocated at the target NG-RAN node. | YES | ignore |
| PDU Session Resource Admitted List | | 1 | | | YES | ignore |

-continued

*** Start Revised Version of Section 9.2.3.5 of 3GPP TS 38.413V 16.7.0 ***
9.2.3.5 HANDOVER REQUEST ACKNOWLEDGE
This message is sent by the target NG-RAN node to inform the AMF about the prepared resources at the target.
Direction: NG-RAN node → AMF.

| | | | | | | |
|---|---|---|---|---|---|---|
| >PDU Session Resource Admitted Item | | 1 . . . <maxnoofPDUSessions> | | | — | |
| >>PDU Session ID | M | | 9.3.1.50 | | — | |
| >>Handover Request Acknowledge Transfer | M | | OCTET STRING | Containing the Handover Request Acknowledge Transfer IE specified in subclause 9.3.4.11. | — | |
| >>Slice Maximum Bit Rate Enforcement Indicator | O | | 9.3.1.y | | | |
| PDU Session Resource Failed to Setup List | | 0 . . . 1 | | | YES | ignore |
| >PDU Session Resource Failed to Setup Item | | 1 . . . <maxnoofPDUSessions> | | | — | |
| >>PDU Session ID | M | | 9.3.1.50 | | — | |
| >>Handover Resource Allocation Unsuccessful Transfer | M | | OCTET STRING | Containing the Handover Resource Allocation Unsuccessful Transfer IE specified in subclause 9.3.4.19. | | |
| Target to Source Transparent Container | M | | 9.3.1.21 | | YES | reject |
| Criticality Diagnostics | O | | 9.3.1.3 | | YES | ignore |

| Range bound | Explanation |
|---|---|
| maxnoofPDUSessions | Maximum no. of PDU sessions allowed towards one UE. Value is 256. |

*** End Revised Version of Section 9.2.3.5 of 3GPP TS 38.413V 16.7.0 ***

In another example, the RAN may signal to the AMF a list of S-NSSAIs for which an active use plane is in place for the UE and for each of such S-NSSAIs the RAN may signal to the AMF an indication of whether enforcement of the S-MBR is supported/not-supported/feasible/not-feasible.

Figure 10:
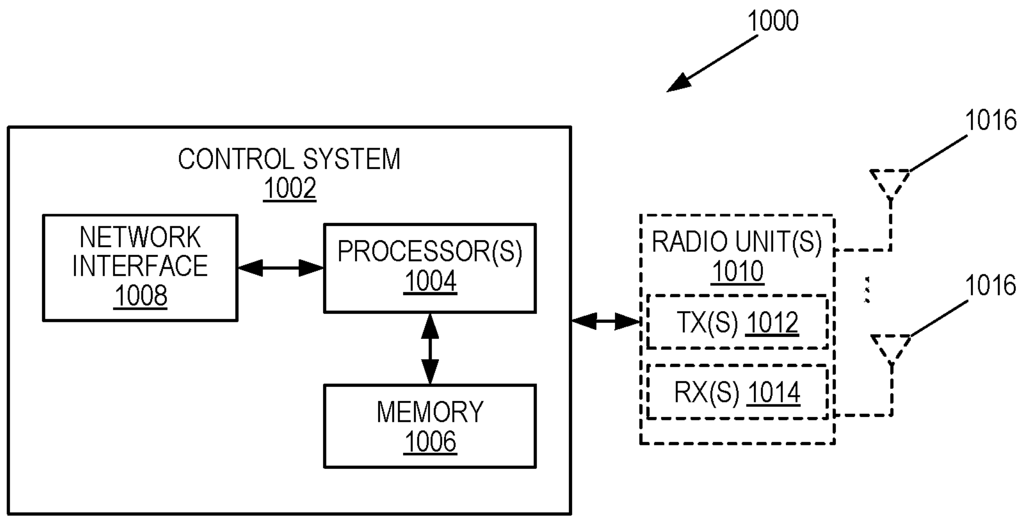
FIGS. 10, 11, and 12 are schematic block diagrams of example embodiments of a network node.

FIG. 10 is a schematic block diagram of a network node 1000 according to some embodiments of the present disclosure. Optional features are represented by dashed boxes. The network node 1000 may be, for example, a base station 102 or 106 or a network node that implements all or part of the functionality of the base station 102 or gNB or a network node that implements all or a part of the functionality of a NF such as, e.g., the AMF 200, SMF 208, or PCF 210, as described herein. As illustrated, the network node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addition, if the network node 1000 is a RAN node, the network node 1000 may include one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of the network node 1000 as described herein (e.g., one or more functions of a base station 102 or 106 or a network node that implements all or part of the functionality of the base station 102 or gNB or one or more functions of a network node that implements all or a part of the functionality of a NF such as, e.g., the AMF 200, SMF 208, or PCF 210, as described herein). In some embodiments, the function(s) are implemented in software that is stored, e.g., in the memory 1006 and executed by the one or more processors 1004.

Figure 11:
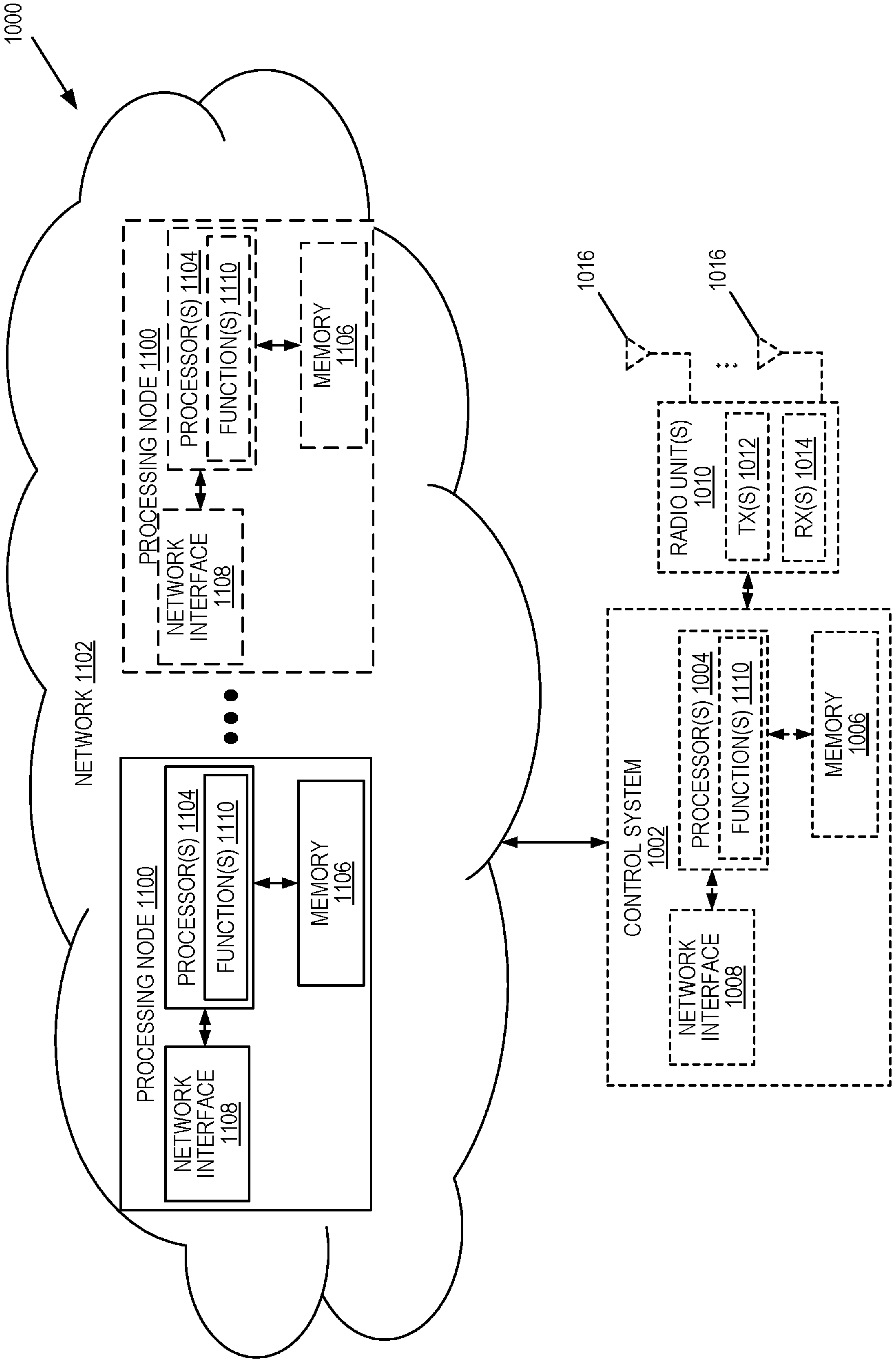

FIG. 11 is a schematic block diagram that illustrates a virtualized embodiment of the network node 1000 according to some embodiments of the present disclosure. Again, optional features are represented by dashed boxes. As used herein, a "virtualized" network node is an implementation of the network node 1000 in which at least a portion of the functionality of the network node 1000 is implemented as a virtual component(s) (e.g., via a virtual machine(s) executing on a physical processing node(s) in a network(s)). As illustrated, the network node 1000 includes one or more processing nodes 1100 coupled to or included as part of a network(s) 1102. Each processing node 1100 includes one or more processors 1104 (e.g., CPUs, ASICs, FPGAS, and/or the like), memory 1106, and a network interface 1108. If the network node 1000 is a RAN node, the network node 1000 may include the control system 1002 and/or the one or more radio units 1010, as described above. The control system 1002 may be connected to the radio unit(s) 1010 via, for example, an optical cable or the like. If present, the control system 1002 or the radio unit(s) are connected to the processing node(s) 1100 via the network 1102. Each processing node 1100 includes one or more processors 1104 (e.g., CPUs, ASICS, FPGAS, and/or the like), memory 1106, and a network interface 1108.

In this example, functions 1110 of the network node 1000 described herein (e.g., one or more functions of a base station 102 or 106 or a network node that implements all or part of the functionality of the base station 102 or gNB or one or more functions of a network node that implements all or a part of the functionality of a NF such as, e.g., the AMF 200, SMF 208, or PCF 210, as described herein) are implemented at the one or more processing nodes 1100 or distributed across the one or more processing nodes 1100 and the control system 1002 and/or the radio unit(s) 1010 in any desired manner. In some particular embodiments, some or all of the functions 1110 of the network node 1000 described herein are implemented as virtual components executed by one or more virtual machines implemented in a virtual environment(s) hosted by the processing node(s) 1100. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of the network node 1000 or a node (e.g., a processing node 1100) implementing one or more of the functions 1110 of the network node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
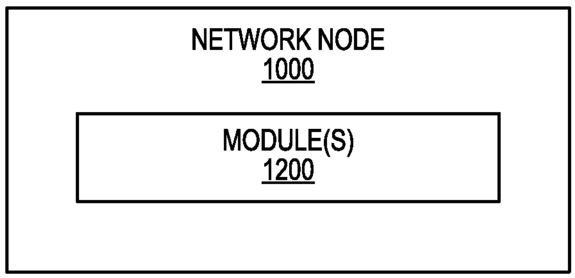

FIG. 12 is a schematic block diagram of the network node 1000 according to some other embodiments of the present disclosure. The network node 1000 includes one or more modules 1200, each of which is implemented in software. The module(s) 1200 provide the functionality of the network node 1000 described herein. This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the FIGURES may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed in a core network (110) of a cellular communications system (100), the method comprising:

- at an Access and Mobility Management Function, AMF, (200):
  - obtaining (FIG. 4A, step 3) information about whether a Radio Access Network, RAN, node (102) supports Slice Maximum Bitrate, S-MBR, enforcement;
  - sending (FIG. 4A, step 3), to a Session Management Function, SMF, (208), a message that comprises an (e.g., explicit or implicit) indication of whether the RAN node (102) supports S-MBR enforcement;
- at the SMF (208):
  - sending, to a Policy and Control Function, PCF, (210), a message that comprises an (e.g., explicit or implicit) indication of whether the RAN node (102) supports S-MBR enforcement;
- at the PCF (210):
  - receiving (FIG. 4A, step 3; 600), from the SMF (208), the message that comprises the indication of whether the RAN node (102) supports S-MBR enforcement;
  - making (602) a determination of whether to apply a mechanism to enforce S-MBR for Protocol Data Unit, PDU, session of a wireless communication device (112) on a network slice based on whether the RAN node (102) supports S-MBR enforcement as indicated by the received message; and
  - operating (604) in accordance with the determination.

Embodiment 2: The method of embodiment 1 wherein:

- the message received at the PCF (210) comprises information that indicates that that RAN node (102) supports S-MBR enforcement; and
- at the PCF (210):
  - making (602) the determination at the PCF (210) comprises making (602) the determination to not apply the mechanism to enforce S-MBR at the PCF (210); and operating (604) in accordance with the determination comprises refraining from applying the mechanism to enforce S-MBR at the PCF (210).

Embodiment 3: The method of embodiment 1 wherein: the message received at the PCF (210) comprises information that indicates that that RAN node (102) does not support S-MBR enforcement; and at the PCF (210):

making (602) the determination at the PCF (210) comprises making (602) the determination to apply the mechanism to enforce S-MBR at the PCF (210); and operating (604) in accordance with the determination comprises applying the mechanism to enforce S-MBR at the PCF (210).

Embodiment 4: The method of any of embodiments 1 to 3 wherein, at the AMF (200), obtaining (FIG. 4A, step 3) the information about whether the RAN node (102) supports S-MBR enforcement comprises receiving the information about whether the RAN node (102) supports S-MBR enforcement from another network node.

Embodiment 5: The method of embodiment 4 wherein the other network node is an Operations and Management, OAM, node.

Embodiment 6: The method of any of embodiments 1 to 3 wherein, at the AMF (200), obtaining (FIG. 4A, step 3) the information about whether the RAN node (102) supports S-MBR enforcement comprises receiving, from the RAN node (102), a message that indicates failure of a procedure where S-MBR is included.

Embodiment 7: The method of embodiment 6 wherein the message that indicates failure of a procedure where S-MBR is included in an initial context setup failure message.

Embodiment 8: The method of any of embodiments 1 to 3 wherein, at the AMF (200), obtaining (FIG. 4A, step 3) the information about whether the RAN node (102) supports S-MBR enforcement comprises receiving, from the RAN node (102), an indication that the RAN node (102) supports S-MBR enforcement.

Embodiment 9: The method of embodiment 8 wherein receiving the indication from the RAN node (102) comprises receiving the S-MBR that is associated with a specific S-NSSAI that can be enforced or some other kind of 'ack' in an appropriate message.

Embodiment 10: The method of embodiment 8 wherein receiving the indication from the RAN node (102) comprises receiving the indication during a NG-setup procedure.

Embodiment 11: The method of any of embodiments 1 to 10 wherein the message sent from the AMF (200) to the SMF (208) that comprises the indication of whether the RAN node (102) supports S-MBR enforcement is a Nsmf_PDUSession_CreateSMContext Request message.

Embodiment 12: The method of embodiment 11 further comprising, at the SMF (208), selecting (FIG. 4A, step 7a) the PCF (210) such that the same PCF (210) is selected for all PDU sessions of the wireless communication device (112) on the same network slice (i.e., the same S-NSSAI).

Embodiment 13: A method performed by an Access and Mobility Management Function, AMF, (200) in a core network (110) of a cellular communications system (100), the method comprising: obtaining (FIG. 4A, step 3) information about whether a Radio Access Network, RAN, node (102) supports Slice Maximum Bitrate, S-MBR, enforcement; and sending (FIG. 4A, step 3), to a Session Management Function, SMF, (208), a message that comprises an (e.g., explicit or implicit) indication of whether the RAN node (102) supports S-MBR enforcement.

Embodiment 14: The method of embodiment 13 wherein obtaining (FIG. 4A, step 3) the information about whether the RAN node (102) supports S-MBR enforcement comprises receiving the information about whether the RAN node (102) supports S-MBR enforcement from another network node.

Embodiment 15: The method of embodiment 14 wherein the other network node is an Operations and Management, OAM, node.

Embodiment 16: The method of embodiment 13 wherein obtaining (FIG. 4A, step 3) the information about whether the RAN node (102) supports S-MBR enforcement comprises receiving, from the RAN node (102), a message that indicates failure of a procedure where S-MBR is included.

Embodiment 17: The method of embodiment 16 wherein the message that indicates failure of a procedure where S-MBR is included in an initial context setup failure message.

Embodiment 18: The method of embodiment 13 wherein obtaining (FIG. 4A, step 3) the information about whether the RAN node (102) supports S-MBR enforcement comprises receiving, from the RAN node (102), an indication that the RAN node (102) supports S-MBR enforcement.

Embodiment 19: The method of embodiment 18 wherein receiving the indication from the RAN node (102) comprises receiving the S-MBR that is associated with a specific S-NSSAI that can be enforced or some other kind of 'ack' in an appropriate message.

Embodiment 20: The method of embodiment 18 wherein receiving the indication from the RAN node (102) comprises receiving the indication during a NG-setup procedure.

Embodiment 21: The method of any of embodiments 13 to 20 wherein the message sent from the AMF (200) to the SMF (208) that comprises the indication of whether the RAN node (102) supports S-MBR enforcement is a Nsmf_PDUSession_CreateSMContext Request message.

Embodiment 22: A method performed by a Policy and Control Function, PCF, (210) in a core network (110) of a cellular communications system (100), the method comprising: receiving (FIG. 4A, step 3; 600) a message that comprises the indication of whether the RAN node (102) supports S-MBR enforcement; making (602) a determination of whether to apply a mechanism to enforce S-MBR for Protocol Data Unit, PDU, session of a wireless communication device (112) on a network slice based on whether the RAN node (102) supports S-MBR enforcement as indicated by the received message; and operating (604) in accordance with the determination.

Embodiment 23: The method of embodiment 22 wherein: the message received at the PCF (210) comprises information that indicates that that RAN node (102) supports S-MBR enforcement; making (602) the determination at the PCF (210) comprises making (602) the determination to not apply the mechanism to enforce S-MBR at the PCF (210); and operating (604) in accordance with the determination comprises refraining from applying the mechanism to enforce S-MBR at the PCF (210).

Embodiment 24: The method of embodiment 22 wherein: the message received at the PCF (210) comprises information that indicates that that RAN node (102) does not support S-MBR enforcement; making (602) the determination at the PCF (210) comprises making (602) the determination to apply the mechanism to enforce S-MBR at the PCF (210); and operating (604) in accordance with the determination comprises applying the mechanism to enforce S-MBR at the PCF (210).

Embodiment 25: A network node (1000) adapted to perform the method of any of embodiments 13 to 24.

Embodiment 26: A network node (1000) comprising processing circuitry (704; 804) configured to cause the network node (1000) to perform the method of any of embodiments 13 to 24.

Embodiment 27: A method performed in a cellular communications system (100), the method comprising:

- at a core network node (200) in a core network (110) of the cellular communications system (100):
  - sending (600; 700; 900) a message to a radio access network, RAN, node (102) in a RAN of the cellular communications system (100), the message comprising slice-maximum bit rate, S-MBR, information for one or more network slices;
- at a radio access network, RAN, node (102) in a RAN of the cellular communications system (100):
  - receiving (600; 700; 900) the message comprising the S-MBR information for one or more network slices from the core network node (200).

Embodiment 28: The method of embodiment 27 wherein the message is a message associated to signaling or updating of a UE context of an associated UE.

Embodiment 29: The method of embodiment 27 wherein the message is a message associated to signaling of a PDU session modification.

Embodiment 30: The method of embodiment 27 further comprising, at the RAN node (102), sending (602; 902) a response to the core network node (200), the response comprising information that explicitly or implicitly indicates whether the RAN node (102) supports S-MBR enforcement and/or whether S-MBR enforcement is feasible at the RAN node (102).

Embodiment 31: The method of embodiment 30 wherein the message is an Initial UE Context Setup Request message and the response is an Initial UE Context Setup Failure message.

Embodiment 32: The method of embodiment 31 wherein the S-MBR information comprises S-MBR value(s) for network slices for which PDU sessions with an active user plane are established at the RAN node.

Embodiment 33: The method of embodiment 31 or 32 wherein the S-MBR information comprises S-MBR value(s) for network slices that do not have an active user plane connection established at the RAN node.

Embodiment 34: The method of any of embodiments 30 to 33 wherein the information comprised in the response comprises information that indicates whether the RAN node (102) supports S-MBR enforcement and/or whether S-MBR enforcement is feasible at the RAN node (102) for a particular network slice.

Embodiment 35: The method of any of embodiments 30 to 34 wherein the information comprised in the response comprises information that indicates whether the RAN node (102) supports S-MBR enforcement and/or whether S-MBR enforcement is feasible at the RAN node (102) for a particular PDU session.

Embodiment 36: The method of any of embodiments 30 to 33 wherein the information comprised in the response comprises, for each PDU session of one or more PDU sessions for which an active user plane is established at the RAN node, information that indicates whether the RAN node (102) supports S-MBR enforcement and/or whether S-MBR enforcement is feasible at the RAN node (102) for the PDU session.

Embodiment 37: The method of any of embodiments 30 to 36 wherein the information comprised in the response comprises a slice maximum bit rate enforcement indicator.

Embodiment 38: The method of any of embodiments 30 to 37 wherein the response is a NGAP message.

Embodiment 39: The method of any of embodiments 30 to 37 wherein the response is a PDU session response setup response, a PDU session resource modify response, a PDU session resource notify, an initial UE context setup response, or a handover request acknowledge.

Embodiment 40: The method of any of embodiments 30 to 39 further comprising, at the core network node (200), performing one or more actions based on the information comprised in the response.

Embodiment 41: The method of any of embodiments 27 to 40 wherein the core network node (200) is an AMF (200).

Embodiment 42: A method performed by a core network node (200) in a core network (110) of the cellular communications system (100), the method comprising: sending (600; 700; 900) a message to a radio access network, RAN, node (102) in a RAN of the cellular communications system (100), the message comprising slice-maximum bit rate, S-MBR, information for one or more network slices.

Embodiment 43: The method of embodiment 42 wherein the message is a message associated to signaling or updating of a UE context of an associated UE.

Embodiment 44: The method of embodiment 42 wherein the message is a message associated to signaling of a PDU session modification.

Embodiment 45: The method of embodiment 42 further comprising receiving (602; 902) a response from the RAN node (102), the response comprising information that explicitly or implicitly indicates whether the RAN node (102) supports S-MBR enforcement and/or whether S-MBR enforcement is feasible at the RAN node (102).

Embodiment 46: The method of embodiment 45 wherein the message is an Initial UE Context Setup Request message and the response is an Initial UE Context Setup Failure message.

Embodiment 47: The method of embodiment 46 wherein the S-MBR information comprises S-MBR value(s) for network slices for which PDU sessions with an active user plane are established at the RAN node.

Embodiment 48: The method of embodiment 46 or 47 wherein the S-MBR information comprises S-MBR value(s) for network slices that do not have an active user plane connection established at the RAN node.

Embodiment 49: The method of any of embodiments 45 to 48 wherein the information comprised in the response comprises information that indicates whether the RAN node (102) supports S-MBR enforcement and/or whether S-MBR enforcement is feasible at the RAN node (102) for a particular network slice.

Embodiment 50: The method of any of embodiments 45 to 49 wherein the information comprised in the response comprises information that indicates whether the RAN node (102) supports S-MBR enforcement and/or whether S-MBR enforcement is feasible at the RAN node (102) for a particular PDU session.

Embodiment 51: The method of any of embodiments 45 to 48 wherein the information comprised in the response comprises, for each PDU session of one or more PDU sessions for which an active user plane is established at the RAN node, information that indicates whether the RAN node (102) supports S-MBR enforcement and/or whether S-MBR enforcement is feasible at the RAN node (102) for the PDU session.

Embodiment 52: The method of any of embodiments 45 to 51 wherein the information comprised in the response comprises a slice maximum bit rate enforcement indicator.

Embodiment 53: The method of any of embodiments 45 to 52 wherein the response is a NGAP message.

Embodiment 54: The method of any of embodiments 45 to 52 wherein the response is a PDU session response setup response, a PDU session resource modify response, a PDU session resource notify, an initial UE context setup response, or a handover request acknowledge.

Embodiment 55: The method of any of embodiments 45 to 54 further comprising performing one or more actions based on the information comprised in the response.

Embodiment 56: The method of any of embodiments 42 to 55 wherein the core network node (200) is an AMF (200).

Embodiment 57: A method performed by a radio access network, RAN, node (102) in a RAN of the cellular communications system (100), the method comprising receiving (600; 700; 900) a message from a core network node (200) in a core network (110) of the cellular communications system (100), the message comprising slice-maximum bit rate, S-MBR, information for one or more network slices.

Embodiment 58: The method of embodiment 57 wherein the message is a message associated to signaling or updating of a UE context of an associated UE.

Embodiment 59: The method of embodiment 57 wherein the message is a message associated to signaling of a PDU session modification.

Embodiment 60: The method of embodiment 57 further comprising sending (602; 902) a response to the core network node (200), the response comprising information that explicitly or implicitly indicates whether the RAN node (102) supports S-MBR enforcement and/or whether S-MBR enforcement is feasible at the RAN node (102).

Embodiment 61: The method of embodiment 60 wherein the message is an Initial UE Context Setup Request message and the response is an Initial UE Context Setup Failure message.

Embodiment 62: The method of embodiment 61 wherein the S-MBR information comprises S-MBR value(s) for network slices for which PDU sessions with an active user plane are established at the RAN node.

Embodiment 63: The method of embodiment 61 or 62 wherein the S-MBR information comprises S-MBR value(s) for network slices that do not have an active user plane connection established at the RAN node.

Embodiment 64: The method of any of embodiments 60 to 63 wherein the information comprised in the response comprises information that indicates whether the RAN node (102) supports S-MBR enforcement and/or whether S-MBR enforcement is feasible at the RAN node (102) for a particular network slice.

Embodiment 65: The method of any of embodiments 60 to 64 wherein the information comprised in the response comprises information that indicates whether the RAN node (102) supports S-MBR enforcement and/or whether S-MBR enforcement is feasible at the RAN node (102) for a particular PDU session.

Embodiment 66: The method of any of embodiments 60 to 63 wherein the information comprised in the response comprises, for each PDU session of one or more PDU sessions for which an active user plane is established at the RAN node, information that indicates whether the RAN node (102) supports S-MBR enforcement and/or whether S-MBR enforcement is feasible at the RAN node (102) for the PDU session.

Embodiment 67: The method of any of embodiments 60 to 66 wherein the information comprised in the response comprises a slice maximum bit rate enforcement indicator.

Embodiment 68: The method of any of embodiments 60 to 67 wherein the response is a NGAP message.

Embodiment 69: The method of any of embodiments 60 to 67 wherein the response is a PDU session response setup response, a PDU session resource modify response, a PDU session resource notify, an initial UE context setup response, or a handover request acknowledge.

Embodiment 70: The method of any of embodiments 27 to 69 wherein the core network node (200) is an AMF (200).

Embodiment 71: A network node (1000) adapted to perform the method of any of embodiments 42 to 70.

Embodiment 72: A network node (1000) comprising processing circuitry (1004; 1104) configured to cause the network node (1000) to perform the method of any of embodiments 42 to 70.

Those skilled in the art will recognize improvements and modifications to the embodiments of the present disclosure. All such improvements and modifications are considered within the scope of the concepts disclosed herein.

The invention claimed is:

1. A method performed in a core network of a cellular communications system, the method comprising:
- at an Access and Mobility Management Function, AMF:
  - obtaining information about whether a Radio Access Network, RAN, node supports Slice Maximum Bitrate, S-MBR, enforcement;
  - sending, to a Session Management Function, SMF, a message that comprises an indication of whether the RAN node supports S-MBR enforcement;
- at the SMF:
  - sending, to a Policy and Control Function, PCF, a message that comprises an indication of whether the RAN node supports S-MBR enforcement;
- at the PCF:
  - receiving, from the SMF, the message that comprises the indication of whether the RAN node supports S-MBR enforcement;
  - making a determination of whether to apply a mechanism to enforce S-MBR for Protocol Data Unit, PDU, session of a wireless communication device on a network slice based on whether the RAN node supports S-MBR enforcement as indicated by the received message; and
  - operating in accordance with the determination,
- wherein:
  - the obtained information comprises information that indicates that that RAN node supports S-MBR enforcement;
  - making the determination comprises making the determination to not apply the mechanism to enforce S-MBR in the core network; and
  - operating in accordance with the determination comprises operating such that the mechanism to enforce S-MBR in the core network is not applied, or
- wherein:
  - the obtained information comprises information that indicates that that RAN node does not support S-MBR enforcement;
  - making the determination comprises making the determination to apply the mechanism to enforce S-MBR in the core network; and
  - operating in accordance with the determination comprises operating such that the mechanism to enforce S-MBR in the core network is applied.

2. A method performed by a core network node in a core network of a cellular communications system, the method comprising:

obtaining information that indicates whether a Radio Access Network, RAN, node supports Slice Maximum Bit Rate, S-MBR, enforcement;

making a determination of whether to apply a mechanism to enforce an S-MBR for one or more Protocol Data Unit, PDU, sessions of a wireless communication device on a network slice in the core network based on whether the RAN node supports S-MBR enforcement as indicated by the obtained information; and operating in accordance with the determination, wherein:

the obtained information comprises information that indicates that that RAN node supports S-MBR enforcement;

making the determination comprises making the determination to not apply the mechanism to enforce S-MBR in the core network; and operating in accordance with the determination comprises operating such that the mechanism to enforce S-MBR in the core network is not applied, or wherein:

the obtained information comprises information that indicates that that RAN node does not support S-MBR enforcement;

making the determination comprises making the determination to apply the mechanism to enforce S-MBR in the core network; and operating in accordance with the determination comprises operating such that the mechanism to enforce S-MBR in the core network is applied.

3. The method of claim 2 wherein the core network node is a Policy and Control Function, PCF; an Access and Mobility Management Function, AMF; or a Session Management Function, SMF.

4. The method of claim 2 wherein:

the obtained information comprises information that indicates that that RAN node supports S-MBR enforcement;

making the determination comprises making the determination to not apply the mechanism to enforce S-MBR in the core network; and operating in accordance with the determination comprises operating such that the mechanism to enforce S-MBR in the core network is not applied.

5. The method of claim 2 wherein:

the obtained information comprises information that indicates that that RAN node does not support S-MBR enforcement;

making the determination comprises making the determination to apply the mechanism to enforce S-MBR in the core network; and operating in accordance with the determination comprises operating such that the mechanism to enforce S-MBR in the core network is applied.

6. The method of claim 2 wherein the core network node is a Policy and Control Function, PCF.

7. The method of claim 6 wherein obtaining the information comprises receiving a message that comprises information that indicates whether the RAN node supports S-MBR enforcement.

8. The method of claim 7 wherein receiving the message comprises receiving the message from an Access and Mobility Management Function, AMF.

9. The method of claim 7 wherein:

the message received at the PCF comprises information that indicates that that RAN node supports S-MBR enforcement;

making the determination comprises making the determination to not apply the mechanism to enforce S-MBR at the PCF; and operating in accordance with the determination comprises refraining from applying the mechanism to enforce S-MBR at the PCF.

10. The method of claim 7 wherein:

the message received at the PCF comprises information that indicates that that RAN node does not support S-MBR enforcement;

making the determination comprises making the determination to apply the mechanism to enforce S-MBR at the PCF; and operating in accordance with the determination comprises applying the mechanism to enforce S-MBR at the PCF.

* * * * *